United States Patent
Ahuja et al.

(10) Patent No.: US 6,981,055 B1
(45) Date of Patent: Dec. 27, 2005

(54) METHOD AND SYSTEM FOR OPTIMIZING ROUTING THROUGH MULTIPLE AVAILABLE INTERNET ROUTE PROVIDERS

(75) Inventors: Abha Ahuja, Seattle, WA (US); Matt Ayers, Seattle, WA (US); Ben Black, Seattle, WA (US); Chris Brown, Issaquah, WA (US); Daniel T. Cohn, Prairie Village, KS (US); Stephen Ramsey, Seattle, WA (US); Ophir Ronen, Seattle, WA (US); Paul J. Schachter, Seattle, WA (US); Oscar B. Stiffelman, Seattle, WA (US); Christopher D. Wheeler, Seattle, WA (US)

(73) Assignee: Internap Network Services Corporation, Atlanta, GA (US)

( * ) Notice: Subject to any disclaimer, the term of this patent is extended or adjusted under 35 U.S.C. 154(b) by 994 days.

(21) Appl. No.: 09/644,221

(22) Filed: Aug. 22, 2000

(51) Int. Cl.⁷ ............................................. G06F 15/173
(52) U.S. Cl. ..................... 709/238; 709/239; 370/401
(58) Field of Search ................. 709/238, 239, 709/241; 370/351, 401, 409, 911, 91

(56) References Cited

U.S. PATENT DOCUMENTS

| | | |
|---|---|---|
| 5,707,780 A | 1/1998 | Lawton et al. |
| 5,712,979 A | 1/1998 | Graber et al. |
| 5,751,956 A | 5/1998 | Kirsch |
| 5,774,668 A | 6/1998 | Choquier |
| 5,802,302 A | 9/1998 | Waclawsky et al. |
| 5,812,776 A | 9/1998 | Gifford |
| 5,845,215 A | 12/1998 | Henry et al. |
| 5,856,981 A * | 1/1999 | Voelker ..................... 714/712 |
| 5,991,705 A | 11/1999 | Klein et al. |
| 5,999,103 A | 12/1999 | Croslin |
| 6,006,264 A | 12/1999 | Colby et al. |
| 6,016,307 A | 1/2000 | Kaplan et al. |
| 6,047,376 A | 4/2000 | Hosoe |
| 6,052,730 A | 4/2000 | Felciano et al. |
| 6,067,558 A | 5/2000 | Wendt et al. |
| 6,128,279 A | 10/2000 | O'Neil et al. |
| 6,138,162 A | 10/2000 | Pistriotto et al. |
| 6,173,322 B1 | 1/2001 | Hu |
| 6,195,691 B1 | 2/2001 | Brown |
| 6,243,750 B1 | 6/2001 | Verma |
| 6,295,275 B1 * | 9/2001 | Croslin ...................... 370/216 |
| 6,314,093 B1 * | 11/2001 | Mann et al. ................ 370/351 |
| 6,343,323 B1 | 1/2002 | Kalpio et al. |
| 6,360,262 B1 | 3/2002 | Guenthner et al. |
| 6,411,946 B1 * | 6/2002 | Chaudhuri ................... 706/21 |
| 6,526,283 B1 | 2/2003 | Jang |
| 6,542,468 B1 | 4/2003 | Hatakeyama |

FOREIGN PATENT DOCUMENTS

| | | |
|---|---|---|
| JP | 5-316205 | 11/1993 |
| JP | WO 98/19439 | 5/1998 |
| JP | 2933905 | 5/1999 |
| WO | WO 00/11850 A1 | 3/2000 |
| WO | WO 00/079730 | 12/2000 |

\* cited by examiner

*Primary Examiner*—Mehmet B. Geckil
(74) *Attorney, Agent, or Firm*—Kilpatrick Stockton LLP; Brenda O. Holmes

(57) ABSTRACT

A method and system for optimizing routing traffic to a destination when multiple routes are available. A performance monitoring and inference component measures the performance of the available paths to a large set of subnetworks, and uses those measurements to infer the performance of all available paths to an even larger set of subnetworks. A routing optimization component uses a cost function that assigns a cost to a routing table based on information from the performance monitoring and inference component, as well as other path characteristics, and further uses a minimization methodology to find a routing table with a very low cost, as defined by the cost function. A BGP bridge takes the routing table generated by the routing optimization component and communicates that information to the routers using BGP, thereby ensuring that the routers will route traffic in accordance with the routing table.

63 Claims, 13 Drawing Sheets

|     | AS1 | AS2 | AS3 | AS4 | AS5 | AS6 | AS7 | AS8 |
| --- | --- | --- | --- | --- | --- | --- | --- | --- |
| PR1 | AS2 | AS6 | AS6 | AS1 | AS8 | –   | AS4 | AS5 |
| PR2 | AS2 | AS6 | AS6 | AS1 | AS1 | –   | AS8 | AS7 |
| PR3 | AS4 | AS1 | AS1 | AS7 | AS8 | AS3 | –   | AS7 |
| PR4 | AS5 | AS1 | AS1 | AS7 | AS8 | AS2 | AS8 | –   |

FIG. 10

| AS1 | PR₁ | PR₂ | PR₃ | PR₄ |
|---|---|---|---|---|
| | AS2 | AS2 | AS4 | AS5 |

| AS1 | PR₁ | PR₂ | PR₃ | PR₄ |
|---|---|---|---|---|
| | AS3 | AS3 | AS4 | AS5 |

| AS1 | PR₁ | PR₂ | PR₃ | PR₄ |
|---|---|---|---|---|
| | AS2 | AS3 | AS4 | AS5 |

| AS1 | PR₁ | PR₂ | PR₃ | PR₄ |
|---|---|---|---|---|
| | AS2 | AS3 | AS4 | AS4 |

|     | PR1 | PR2 | PR3 | PR4 |
| --- | --- | --- | --- | --- |
| AS1 | AS2 | AS2 | AS4 | AS5 |
| AS2 | AS6 | AS6 | AS1 | AS1 |
| AS3 | AS6 | AS6 | AS1 | AS1 |
| AS4 | AS1 | AS1 | AS7 | AS7 |
| AS5 | AS8 | AS1 | AS8 | AS8 |
| AS6 | -   | -   | AS3 | AS2 |
| AS7 | AS4 | AS8 | -   | AS8 |
| AS8 | AS5 | AS7 | AS7 | -   |

FIG. 16

METHOD AND SYSTEM FOR OPTIMIZING ROUTING THROUGH MULTIPLE AVAILABLE INTERNET ROUTE PROVIDERS

BACKGROUND OF THE INVENTION

1. Field of the Invention

The present invention pertains generally to routing in interconnected networks, such as the Internet, and more particularly to using a cost function to select among a plurality of alternative routing tables.

2. Description of the Background Art

The Internet Protocol (IP) defines a space of addresses. In IP version 4 (IPv4), the address space is all integers in the range $[0, 2^{32}]$ (approximately 4 billion addresses). There exists a one-to-one mapping between "nodes" on the Internet and addresses. A node is usually assigned to a single computer, but there are many exceptions. For example, there could be multiple computers acting as a single node on the Internet, or, more commonly, a single computer acting as multiple nodes (i.e., assigned multiple IP addresses). A node is connected to an adjacent or "neighboring" node if it is possible for data packets to move between the two nodes without transiting any intermediate nodes. The process of selecting which neighbor to use when sending data packets to any given node is referred to as routing. In particular, the Internet Protocol's strategy of only selecting which adjacent node to use, as opposed to the entire path, is termed "Hop-By-Hop Routing."

Reachability is the most important criteria in making a routing selection. By definition, any neighboring nodes are reachable from each other. In general, node B is reachable from node A if either node B is a neighbor of node A, or node B is reachable from some neighbor of node A. If node B is reachable from more than one neighbor of node A (excluding those neighbors that would use node A to reach node B), then node A must select the next hop node based on the path offered by each. Historically, the Autonomous System (AS) path length, in terms of the number of hops, has been the primary characteristics used in making that selection.

Due to the technical difficulty of storing and communicating reachability and other path information to every node, given the enormous number of nodes, a mechanism of aggregating using subnetworks was devised. Subnetting breaks up the address space into several subnetworks (which are identified by address prefixes), each of which represents a contiguous block of addresses. An AS contains a collection of subnets. Each such collection is disjoint in that a given prefix can be found in only one AS. The unique AS that contains a given prefix is responsible for delivering packets to all of the IP addresses in that prefix. This abstraction reduces the complexity of routing because rather than requiring each node to know about the paths to every other node on the Internet, it is only necessary for nodes to know how to get to the "borders" of their AS. The nodes on the borders (also known as border gateways) are responsible for selecting neighboring border nodes in other ASes that will deliver the packets to the destination AS. Unlike the case with IP addresses, it is possible for border gateways to communicate and store reachability and other path information to all ASes, because the space of ASes is much smaller than the space of IP addresses. The protocol used to exchange this reachability and path information between border gateway nodes is known as the Border Gateway Protocol (BGP), the current version of which is BGP Version 4 (BGP4).

Although BGP successfully reduces the complexity of routing on the Internet to a manageable granularity, it makes necessary tradeoffs in deciding what path characteristics should be available to route selection algorithms. The path information that is exchanged between border gateways includes a list of the ASes in the paths, and most route selection algorithms used in practice usually select the path with the fewest AS hops. While it is possible to make selections based on criteria other than path length (number of AS hops), there is usually not sufficient justification, from the information provided by BGP, not to select the shortest path.

The use of path length is heuristic, in that path length is not necessarily indicative of performance. If all ASes were equivalent and therefore contributed the same penalty when used to reach a given destination AS, then minimizing the AS path length would be a correct strategy for finding an optimal route. Even if the ASes are not equivalent, if the routing algorithm does not have access to any path characteristics besides path length, then selecting the path with the minimal length is a justifiable strategy. However, empirical evidence has demonstrated significant performance differences between ASes. The path with the fewest ASes is often not the fastest to reach a given prefix. Similarly, there will often be several paths with equal AS path length, but with unequal performance because of differences in the ASes. It is because of these differences that additional path characteristics need to be added to the path selection algorithm.

For example, FIG. 1 shows five ASes 10 through 18. As can be seen, there are two paths from AS1 10 to AS5 18; namely, from AS1 10 to AS2 12 to AS5 18 and, alternatively, from AS1 10 to AS3 14 to AS5 18. Note that both paths are shown as having the same number of AS hops and, therefore, have the same BGP path length. As a result, BGP would consider the two paths to be equivalent, in which case the route might be selected by simply employing an arbitrary tie breaking mechanism. Also note that there are two paths from AS1 10 to AS4 16; namely, from AS1 10 to AS2 12 to AS4 16 and, alternatively, from AS1 10 to AS3 14 to AS5 18 to AS2 12 to AS4 16. Here, BGP would typically minimize the number of AS hops and select the route from AS1 10 to AS2 12 to AS4 16. In each of the scenarios outlined above, however, BGP route a selection could lead to inferior performance, such as that which might result from high latency or packet loss. BGP has no way to know of the existence of either condition, and simply routes traffic by minimizing the number AS hops to a destination. Therefore, there is a need for a method that routes traffic based on performance and other path characteristics. The present invention satisfies that need, as well as others, as will be described herein.

BRIEF SUMMARY OF THE INVENTION

The present invention overcomes the inability of BGP to optimize route selection when multiple paths are available by incorporating performance and other path characteristics into the route selection process. The present invention is a performance based routing system and method that can be utilized with any network having one or more multi-homed ASes or equivalent. In addition, as the number of connections from an AS to other ASes increases, more routing choices are available and performance based routing according to the present invention become even more advantageous.

According to one aspect of the invention, a mechanism is provided for controlling routing through the use of a cost function that describes the cost of using any combination of routes. According to another aspect of the invention, a method is provided for minimizing said cost function, for the purpose of finding superior combinations of routes, as defined by said cost function. According to a still further aspect of the invention, a mechanism is provided for interoperating with standard BGP.

By way of example, and not of limitation, at a high level the invention can be described in terms of three components; a performance monitoring and inference component, a routing optimization component, and a BGP bridge.

The performance monitoring and inference component measures the performance of the available paths to a large set of subnetworks, and it uses those measurements to infer the performance of all available paths to an even larger set of subnetworks. There are several kinds of performance measurements that could be relevant, such as latency and packet loss. The output of the performance monitoring and inference component is a table of each type of performance for every available path to every destination.

The routing optimization component uses the table of performance generated by the performance monitoring and inference component, as well as other important information such as the amount of traffic that will be sent to any destination, the capacity available on each path, and the economic price of using any path. The routing optimization component contains a cost function that can assign a cost to any routing table, based on the input information. The routing optimization component uses a minimization methodology to find a routing table with a very low cost, as defined by the cost function. Altering the cost function is the primary way of changing what routing table will be selected by the minimization methodology. The output of the routing optimization component is the routing table found by the minimization methodology.

The BGP bridge takes the routing table generated by the routing optimization component and communicates that information to the routers using BGP, thereby ensuring that the routers will route traffic in accordance with the routing table.

An object of the invention is to make routing decisions based on performance measurements associated with a plurality of alternative paths.

Another object of the invention is to make routing decisions based on operational and/or economic characteristics of a plurality of alternative paths.

Another object of the invention is to determine the cost associated with a routing table.

Another object of the invention is to select a routing table based on minimizing cost.

Another object of the invention is optimize routing decisions when multiple paths to a destination are available.

Another object of the invention is to communicate routing information derived from optimized routing tables to BGP routers.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only and where like reference numbers denote like elements:

FIG. 10 is an example of a routing table for the network configuration shown in FIG. 9.

FIG. 16 shows the routing table of FIG. 10 partitioned for optimization.

DETAILED DESCRIPTION OF THE INVENTION

Referring more specifically to the drawings, for illustrative purposes the present invention is embodied in the system and methods generally described in relation to FIG. 2 through FIG. 20. It will be appreciated that the system may vary as to configuration and as to details of the components, and that the methods may vary as to the specific steps and their sequence, without departing from the basic concepts as disclosed herein.

System Configuration and Operation

Figure 1:
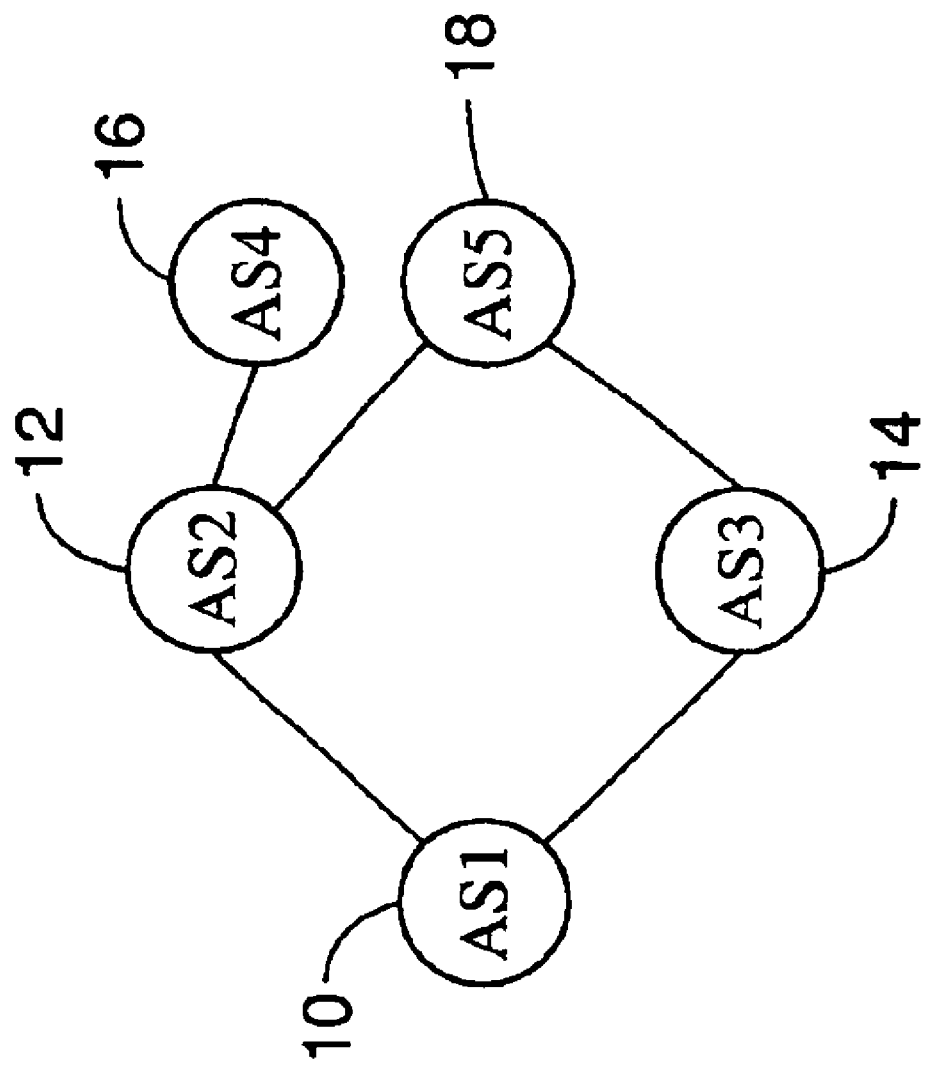
FIG. 1 is a schematic diagram of a network with multiple ASes.
Figure 2:
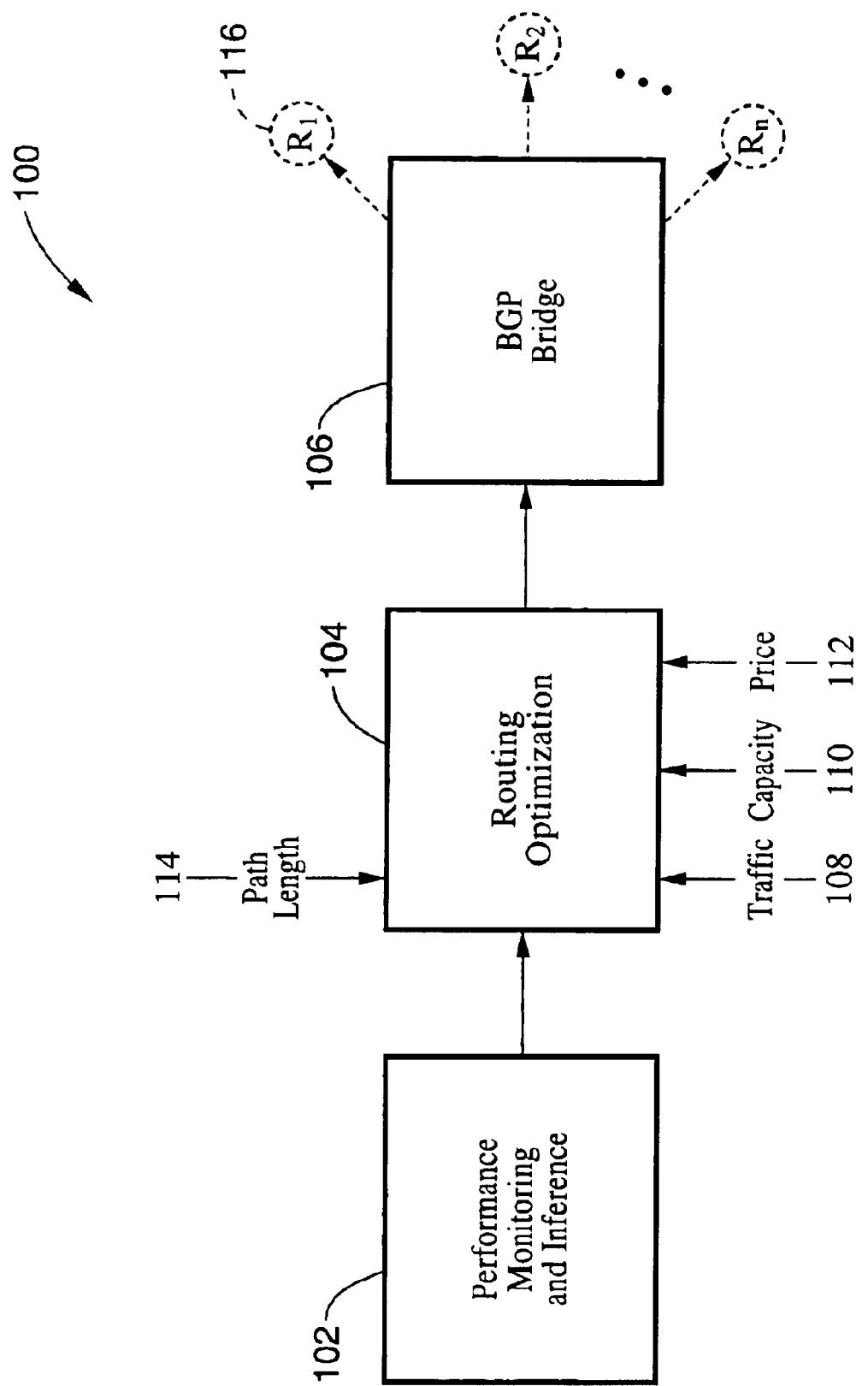
FIG. 2 is a functional block diagram of a performance based routing system according to the present invention.

Referring first to FIG. 2, a functional block diagram of a preferred embodiment of a performance based routing system 100 according to the present invention is shown. In the example shown, the invention comprises a performance monitoring and inference component 102, a routing optimization component 104, and a BGP bridge component 106.

In general terms, performance monitoring and inference component 102 measures the performance of specific paths available to a set of subnetworks, and then uses those measurements to infer the performance of all available paths to a larger set of subnetworks. Examples of performance measurements that can be made by monitoring and inference component 102 include, but are not limited to, latency and packet loss. Performance monitoring and inference component 102 generates a table of each type of performance measured or inferred for each available path to each destination.

Routing optimization component 104 then uses the performance table generated by performance monitoring and inference component 102 and, optionally, additional path characteristics, to determine the "cost" associated with a routing table. The aforementioned additional path characteristics that might typically be used includes the amount of traffic 108 to each destination, the available capacity 110 on each path, the economic price 112 of using any path, and the path length 114. Even the type of traffic (e.g., data vs. voice over IP) could be used as input to routing optimization component 102. The foregoing list is not all inclusive, but is provided by way of example only.

Based on the performance table and any additional path characteristics deemed pertinent to include, a cost function is used to assign a cost to routing tables. An associated minimization process is then carried out to identify a routing table with a "low cost" as defined by the cost function. Note that altering the cost function is the primary way of changing what routing table will be selected by the minimization process. The output of routing optimization component 104 is the routing table found by the minimization methodology to have a low cost.

BGP bridge 106 takes the routing table generated by routing optimization component 104 and communicates that information to routers 116 using BGP, thereby ensuring that the routers will route traffic in accordance with the routing table. Each of the three components of performance based routing system 100 of the present invention will now be discussed in more detail. It should be appreciated that the description of each of these components is provided by way of example, and not of limitation, and that there are many alternative configurations and implementations that those skilled in the art will appreciate can be derived from the description herein.

1. Performance Monitoring and Inference Component

Because BGP does not exchange performance information between ASes, it is necessary to measure the performance of available AS paths independently from the BGP protocol. In the present invention, performance monitoring and inference component 102 measures path characteristics, such as latency and packet loss, which can generally be described as performance characteristics. It will be appreciated, however, that latency and packet loss are presented by way of example, and not of limitation, and that there could be any number of path characteristics relevant to network routing. When possible, the measurements should be performed over all available paths to all destinations, and they should be updated in real time. However, because collecting so many performance measurements may be impractical, performance measurement and inference component 102 uses an inference methodology to predict the performance to some set of destinations based on actual performance to some other set of destinations.

Performance monitoring and inference component 102 is preferably implemented as software that is executed within the AS that is using this invention to control its routing. Furthermore, the performance measurements should be taken from the perspective of the AS so that they accurately describe the performance that the AS is likely to observe as a result of using any neighboring AS to reach any destination subnetwork. Therefore, if multiple ASes are using this invention to control their routing, the performance monitoring and inference component should be executed from within each such AS.

(a) Performance Monitoring

By way of further explanation, examples of methods for measuring latency and packet loss will now be described. It should be appreciated, however, that different techniques may be required to measure other path characteristics.

Those skilled in the art will appreciate that both round-trip latency and packet loss to a specific IP address can be measured using ping, which is a well-known technique. Ping works by sending an Internet Control Message Protocol (ICMP) echo message to a destination host and timing how long it takes to receive an ICMP echo reply from that host. If the response is not received after some specified amount of time, it is treated as a lost packet. An alternative technique is to measure the time between the synchronization (SYN) and acknowledgement (ACK) packets that are used in the three-way handshake to establish a Transmission Control Protocol (TCP) session. The advantage of this technique over classical pings is that it generally provides a more accurate measurement of performance since routers and hosts often deprioritize ICMP traffic. It also provides more visibility into the network because many hosts accept TCP connections that do not accept ICMP messages or cannot receive such messages because of firewalls.

Even more visibility can be provided by a variation of the TCP handshake method. Some firewalls prevent external hosts from initiating TCP sessions by blocking the first SYN packet in the TCP handshake. However, those firewalls usually allow internal hosts to initiate connections with the outside so they allow ACKs to penetrate the firewall. If an ACK is sent to a host that was not expecting it because the host never sent the corresponding SYN, that host will generally respond with a reset (RST) packet indicating that the ACK packet was invalid. Using this behavior, the round trip latency can be determined by measuring the time between the ACK and the RST. This technique does not work for all destinations, however, as some networks are protected by "stateful" firewalls that drop the unexpected ACK before it can reach the host. For machines that willingly accept connections on well-known TCP ports, such as web servers, the SYN ping is the most effective and is the preferred method for obtaining such measurements.

The foregoing measurement techniques assume that the hosts in the network use the TCP/IP protocols. It will be appreciated, however, that if other protocols are developed, there should be comparable methods for establishing the latency and packet loss to a destination. Furthermore, it will also be appreciated that there may be other suitable methods for making such measurements that can be used as well, and that the invention is not limited to the methods which are given by way of the foregoing examples.

Performance and other path characteristics as described above will generally be measured by probing to specific IP addresses using the path offered by a specific next-hop AS. However, routing on the Internet is specified at the granularity of subnetworks (also known as prefixes), which are ranges of IP addresses. Therefore, for the purpose of applying this invention to routing on the Internet, it is necessary to describe the characteristics of the path offered by a given next-hop AS to reach a subnetwork. By way of example, but not of limitation, the preferred method of doing so is to average the individual measurements to specific, representative IP addresses within a given subnetwork to describe the performance to that subnetwork. While there may be alternative ways to define the performance or other characteristics to a subnetwork, averaging the measurements to specific addresses within that subnetwork is preferred because a superior route to a specific subnetwork is one that provides superior performance to the specific addresses within that subnetwork.

(b) Performance Inference

Even though there may be many destinations that cannot be probed using any of the available ping methods for various reasons, the number of destinations that can be probed is still enormous. For example, there are approximately eighty thousand prefixes in use; therefore, the number of measurements that could be made is eighty thousand times the number of ASes from which measurements could be taken. Ideally, measurements of the path offered by each neighboring AS to reach any given subnetwork would be available in real time. However, making so many measurements would require substantial resources. Furthermore, many hosts in those subnetworks, which are the actual recipients of those subnet probes, might treat such frequent probes suspiciously. It can also be technically difficult to monitor performance to a node in a subnetwork over the path offered by a neighboring AS without also shifting all outgoing traffic for that subnetwork on to the neighboring AS. It is therefore useful to be able to infer the performance to a large number of subnetworks over all available paths using measurements to a much smaller number of subnetworks, and over fewer paths.

To reduce the number of measurements that have to be made, performance monitoring and inference component 102 employs a performance inference methodology that extrapolates the performance to some set of subnetworks using measurements to some smaller set of subnetworks. In this regard, note that the performance to two subnetworks should be similar if the difference between the paths used to reach each subnetwork is small. For example, if the paths to reach two different IP addresses are identical except for some divergence near the end, then any difference in performance to those two IP addresses must be attributable to the performance differences over the portions of the paths that are different, provided the destination hosts are considered part of the path. On the other hand, as the paths to the two different addresses diverge, the correlation of the performance to the two addresses should approach zero. Using this principle, addresses that are close to each other in both a geographic and a topological sense should exhibit similar performance. Furthermore, since subnetworks represent a collection of IP addresses, the same reasoning applies to subnetworks. However, when referring to the geographic or topological location of a subnetwork, it should be appreciated that what is meant is the general geographic or topological location of the hosts in that subnetwork.

Note that the topological location of an IP address can often be determined using the standard "traceroute" tool, which attempts to identify all of the router hops on a path selected to reach a destination. However, traceroute frequently provides incomplete information, particularly, because many routers do not respond to traceroute.

Figure 3:
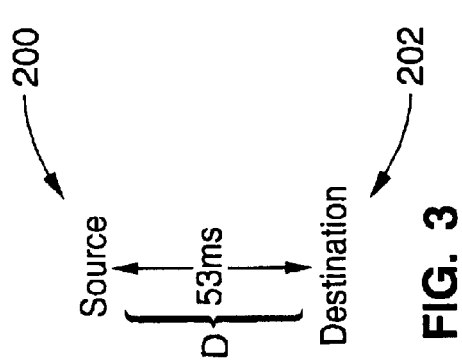
FIG. 3 is a diagram depicting the conversion of a latency measurement from a single source to a single destination into a physical distance.
Figure 4:
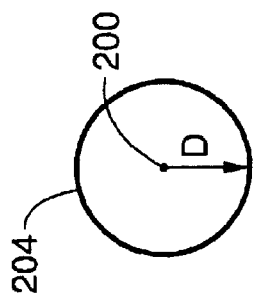
FIG. 4 is diagram depicting the determination of a geographical region derived from the latency and distance measurements depicted in FIG. 3.

While it can be difficult to determine the precise topological location of an IP address, and by extension a subnetwork, the approximate geographic location nevertheless can be identified through the intersection of latency measurements to the same IP address from different sources. Referring to FIG. 3 for example, the observed latency to an IP address from a single source 200 can be converted to an approximation of the distance between the source 200 and the destination IP address 202. The estimated distance D is determined by combining the observed latency, such as 53 ms in the example shown, with an estimate of the speed (in distance per time) of the packets. For example, in fiber-optic cables, packets are known to travel at roughly two-thirds the speed of light in a vacuum. This rate will be affected by several factors including changes in the physical medium, curvature in the network paths, and latency added by routers or other devices. Given these variations, it is more reliable to determine the average rate through statistical observations than through analysis. An upper bound of this speed is easy to specify, however, since no packets can move faster than the speed of light. In this context, latency to a subnetwork is again defined as the average of the latencies to some set of representative IP addresses in that subnetwork.

Figure 6:
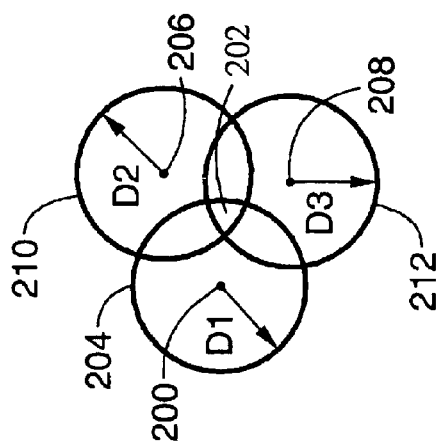
FIG. 6 is a diagram depicting a circular intersection locating technique according to the present invention.
Figure 5:
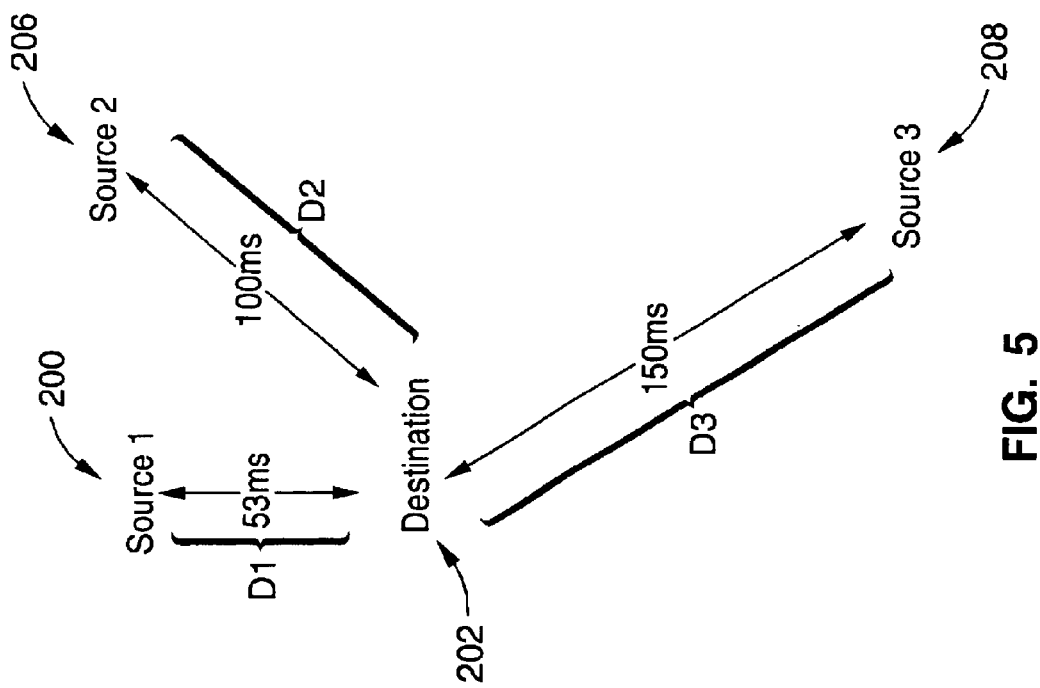
FIG. 5 is a diagram depicting the conversion of latency measurements from multiple sources to a single destination into physical distances.

Once the distance is estimated between a source and the destination, a circle can be defined with radius equal to that distance and with a center located at the geographic location of the source. This is illustrated by circle 204 in FIG. 4 wherein source 200 is in the center and the radius of the circle is distance estimate D. If the distance estimate is known to be an upper bound of the actual distance, then the destination must lie within that circle. Additional circles can be created using distance estimates from other sources to the same destination. For example, FIG. 5 shows three sources 200, 206, 208 having distance estimates D1, D2, and D3 to destination 202, respectively. The source locations and distance estimates can be used to define intersecting circles 204, 210, 212, respectively, as shown in FIG. 6. If all of the distance estimates are upper bounds on the actual distances, then the destination must lie within the intersection of all such circles. This is also illustrated in FIG. 6, wherein destination 202 lies within the intersection of circles 204, 210, 212. Note, that the diameters of circles 204, 210, 212 are not drawn proportionally in this example.

Note that a tight upper bound of each distance will result in a smaller intersection region and hence a more precise estimate of the geographic location of the destination. In addition, adding more sources, especially ones that are geographically diverse with respect to the destination, will further reduce the intersection region and increase the precision of the estimate. In addition, making more measurements and selecting the lowest latency measurement will further decrease the size of the region of intersection. Furthermore, this method can be used both for specific IP addresses and for subnetworks, with the appropriate distance used in each case. Note also, that the sources used in these latency measurements for the purpose of identifying geographic location do not have to be the same sources that are used for monitoring performance and other path characteristics. Whereas the latencies that are collected for monitoring performance and other path characteristics need to be collected from the perspective of the AS that is using those measurements to make routing decisions, the geographic location of any IP address or subnetwork is not relative to the source, and so could be determined from the perspective of any AS.

After estimating the geographic location of each destination, an estimate of the distance between all pairs of destinations can be easily computed. If the distance between two destinations is extremely small, then it may be reasonably accurate to only measure the performance to one of the destinations and to assume that the other destination will have the same performance. The accuracy of this inference depends on how close the two points are to each other, both topologically and geographically. However, if they are geographically very close, they are more likely to be topologically close. Therefore, the confidence in the inference should increase as the distance between the two points decreases. Using this observation, it is possible to combine the performance measurements for several sample destinations into a weighted average that more accurately estimates the performance to a single target destination. The weight assigned to each performance measurement would be the inverse of the distance between the target destination and the sample destination. The inverse of the distance is used to weight each performance measurement because it describes the relative confidence that the performance measurement is the same as the unmeasured performance to the target destination.

Figure 7:
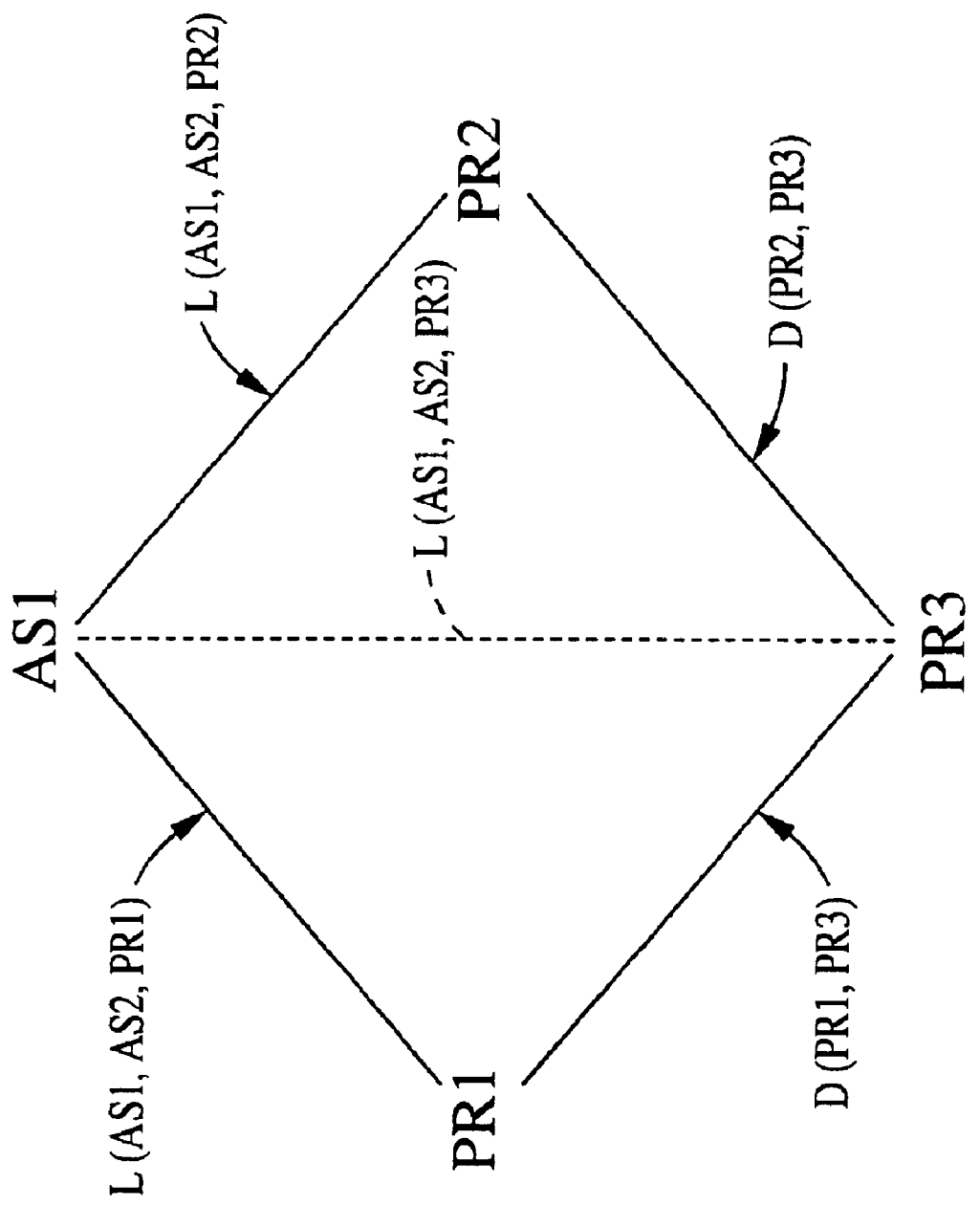
FIG. 7 is a diagram depicting an inference technique according to the present invention.

For example, referring to FIG. 7, if there are three prefixes, PR1, PR2, and PR3, and if latency or measurements of other path characteristics have been made from some source AS1 to each of PR1 and PR2 using a specific next-hop AS2, then it is possible to infer the latency or path characteristic to PR3 using the path offered by AS2. Let L(AS_X, AS_Y, PR_Z) represent the latency from the AS AS_X to the prefix PR_Z when the path offered by AS_Y is used. Also let D(PR_X, PR_Y) represent the distance between prefix PR_X and prefix PR_Y. It is possible to infer the latency from AS1 to PR3 using AS2 as the next-hop AS using the equation $$L(AS1, AS2, PR3) \cong \left( \frac{L(AS1, AS2, PR1)}{D(PR1, PR3)} + \frac{L(AS1, AS2, PR2)}{D(PR2, PR3)} \right) \left( \frac{1}{\frac{1}{D(PR1, PR3)} + \frac{1}{D(PR2, PR3)}} \right).$$

Although measurements to only two prefixes were used in this example, in practice a large number of measurements should be used to make any single inference. Note also that the measurements used in the inference equation must all have been performed using the same next-hop AS, and that AS must match the next-hop AS in the path that is being inferred. In the example, AS2 is the next hop AS both for the measurements and for the inference. This example assumes that there was only one path for sending traffic from the source AS to the destination. However, an AS may be connected to multiple ASes and, therefore, it is likely that more than one next-hop AS will be available for sending traffic to a destination. Therefore, for further clarification, if L(AS1, AS3, PR3) were being inferred, then the measurements would also have to use AS3 as the next hop. A similar computation would be carried out for each of the next-hop ASes. Also, it will be appreciated that the averaging technique described herein is by way of example, only, and that other techniques, including non-averaging techniques, could be used as well. Furthermore, instead of using the inverse of distance to weight each term in the above example, the amount of shared topology as measured by the number of routers that are shared over the path could be used to weight each term.

While there is no guarantee that this technique will accurately estimate the performance to any given destination, its effectiveness is easy to determine using a collection of actual measurements. Using such measurements, it is straightforward to determine the ratio of measurements to inferences that is required for any given degree of accuracy. For example, some randomly selected portion of the measurements can be treated as "out-of-sample" that must be predicted by the remaining "in-sample" measurements. The relative size of the "out-of-sample" data can be decreased until the root-mean-square (RMS) of the error is within an acceptable threshold.

Furthermore, while the foregoing technique for inferring path characteristics is preferred, it will be appreciated that inferences can be made in other ways, including, but not limited to, the following:

1. Monitoring sets of prefixes and then treating all prefixes in the set in the same fashion.
2. Aggregating prefix sets based on similarities and treating all such aggregated prefix sets in the same fashion.
3. Deaggregating prefix sets into subsets that have similar characteristics and treating the subsets in the same fashion.
4. Placing prefixes into sets based on some criteria of similarity such as, but not limited to, performance, geographical location, and other correlation factors, and treating all prefixes in the sets in the same fashion.

Note that a set can be a single prefix, a group of prefixes, the union of two sets wherein the two sets are geographically close, the union of two sets wherein the two sets experience similar performance in relation to ASes, sets of sets and the like.

Lastly, additional improvements to the technique for inferring path characteristics described herein can include, but are not limited to, the following 1. Making the performance measurement over the same AS path as the AS path of the destination for which path characteristics are to be inferred.
2. Adding topology, as determined by traceroute, to the inference technique. In that event, each measurement can be weighted by the length of the path that is common to both the measured destination and to the destination for which the inference is being performed.

(c) Intersection of Circles

Although the inference process needs to be executed frequently in order to account for the changes in performance of different AS paths, the geographic location of subnetworks does not change very frequently. Therefore, the process for determining the geographic location of subnetworks does not need to be carried out very frequently. However, when that process is carried out, it needs to run in a reasonably short amount of time. Most of the computational work of that process involves finding the intersection of a set of circles representing the distance from each source to the destination, so finding that intersection must be done efficiently.

It will be appreciated that the intersection of any two circles can be computed from simple algebra and, assuming the circles actually do intersect, can be described by the two points of intersection. Intersecting a set of circles can be done in two phases. First, the two points of intersection can be computed for all pairs of circles. If any circle is completely contained inside a larger circle, then the larger circle can be discarded. In the second phase, all of the points from the first phase can be tested to determine if they are contained within every circle. The intersection of any two circles runs in constant time, and there are $N*(N-1)/2$ ways to form pairs of $N$ circles, each of which generates two points. The first phase therefore generates $2*N*(N-1)/2 = N*(N-1)$ points. The second phase performs a constant time comparison between each of those points and each of the circles. Since there are N(N−1) points from the first phase, there will be N*N*(N−1) comparisons, so it runs in O(N^3) time. The entire process therefore runs in O(N^2+N^3)=O(N^3) steps, where N is the number of circles.

If the number of sources is large, then the O(N^3) process for intersecting a set of circles may be too slow. However, it is possible to speed up the intersection process using a straightforward approximation that runs in linear time. After intersecting any two circles from the set, a rectangle can be constructed that bounds the region of their intersection. The intersection of the rectangle and any remaining circle, selected arbitrarily, can be represented by a new rectangle. This step can be repeated for all remaining circles, with the rectangle generated at each step used for the intersection at the next step. If the rectangle that is generated to describe each of the intersections completely encloses the region of intersection, then the final rectangle generated at the last step will completely enclose the intersection of the regions of each circle. The first intersection between two circles runs in constant time. Similarly, each of the remaining N−2 steps is a constant time intersection between a circle and a rectangle. Therefore, the entire process runs in O(N) steps where N is the number of circles.

Figure 8B:
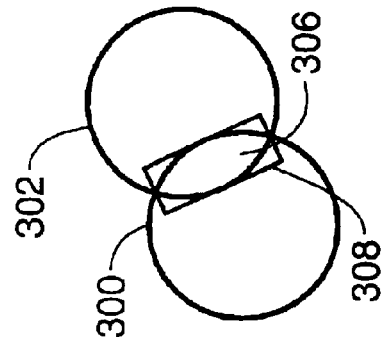
FIG. 8A through FIG. 8D are diagrams depicting an alternative embodiment of the circular intersection technique shown in FIG. 6 which uses approximations running in linear time.
Figure 8D:
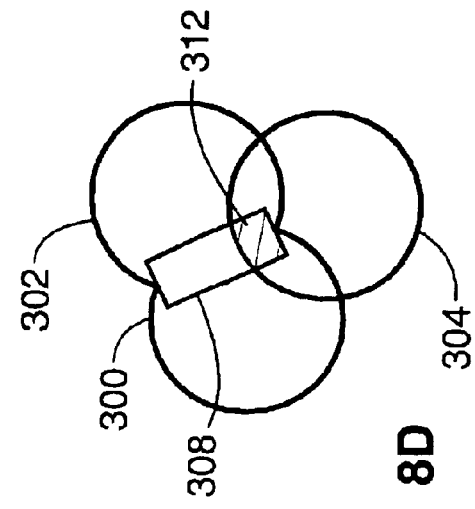
Figure 8A:
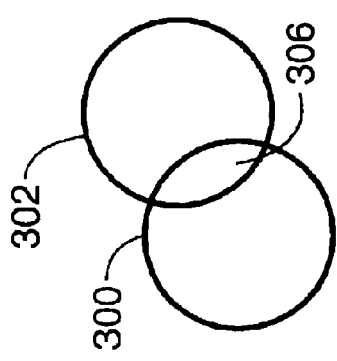
Figure 8C:
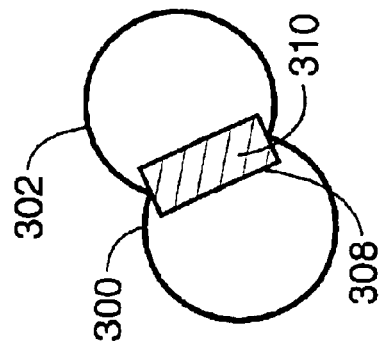

An example of the aforementioned "rectangle approximation" process applied to three intersecting circles 300, 302, 304 is illustrated in FIG. 8A through FIG. 8D. First, the intersection 306 of two of the circles, such as circles 300, 302 would be determined as shown in FIG. 8A. Next, the area of intersection can be circumscribed by an intersection object 308, which is preferably rectangular in shape as shown in FIG. 8B. The intersection object 308 should represent the smallest bounding box that encloses the intersection. Referring also to FIG. 8C, the estimated intersection is the cross-hatched 310 area inside intersection object 308. Now, when the third circle 304 is drawn, the intersection of circle 304 and intersection object 308 can be determined. In the example shown in FIG. 8D, the intersection of circle 304 and intersection object 308 is shown as the cross-hatched area 312.

As can be seen, therefore, the above-described method summarizes previous intersections with an intersection object. The intersection object is then intersected with a subsequent circle or an object representing the subsequent circle. While the intersection objects are preferably rectangular-shaped as described above, they could alternatively have other shapes that are also polygons. The method reduces computational complexity and increases computational speed by employing a computational technique that runs in linear time at the expense of accuracy.

2. Routing Optimization Component

Referring again to FIG. 2, routing optimization component 104 preferably comprises software that generates routing tables based on any data that could be relevant to route selection. It has access to the tables of path characteristics provided by performance monitoring and inference component 102 as well as other pertinent information such as the amount of traffic 108 that is sent to each prefix, the capacity 110 available to each next-hop AS, and the price 112 of using any next-hop AS. Traffic 108 is easily obtained using NetfloW™ or like. The "pipe size" or capacity 110 is available from system design information. Price 112 is available from contracts or other service agreements with backbone providers or others. If there is no other information about the characteristics of a specific path, it is useful to at least know the length 114 of the path in terms of AS hops, so this is also provided to routing optimization component 104 for all paths. This information is readily available from BGP.

Similarly, whether a given subnetwork is reachable from a neighboring AS has to be provided to routing optimization component 104 so that certain routes can be excluded from the selection process. If other variables are deemed relevant to the route selection process, such as the type of traffic, then they should also be made available to routing optimization component 104. Those skilled in the art will appreciate that there are many ways to make the data available to routing optimization component 104, but the most generally applicable solution is to store it in a database.

Given all of the available path information, and any other relevant information, the goal of routing optimization component 104 is to generate a routing table that is as "good" as possible. However, each user of this invention may have a different definition of what is meant by "good" routing. For example, some users may be more concerned about packet loss than latency, and so they would want routing optimization component 104 to generate routing tables that minimize packet loss, even if that means increased latency. Other users may be more concerned with the price of selecting any route, and so they may prefer routing tables that result in higher packet loss and latency if that means they will not have to pay as much. In order to account for different preferences in the route selection process, routing optimization component 104 allows the users to specify a routing table cost function. The cost function must be able to evaluate any routing table and assign it some non-negative, real-valued cost with smaller costs interpreted to mean superior routing tables. The cost function could use the path characteristics or any other relevant information to determine the cost.

While the user of this invention has the freedom to define any cost function, it is the responsibility of the routing optimization component to find a routing table with a small cost as defined by that cost function. Given the enormous space of possible routing tables, the routing optimization component uses a minimization algorithm, rather than exhaustive search, to find routing tables with small cost.

(a) Routing Tables

A routing table is a matrix of which next-hop AS will be used to reach any given prefix. There is a row for each source AS and a column for each destination prefix. For any routing matrix R, the notation R[i,j] will indicate the next-hop AS used by source AS i to reach destination j. If this invention is only controlling routing for a single AS, then there will be only one row in the matrix. However, one of the benefits of this invention is that it can optimize routing over a plurality of source ASes to allow them to more collaboratively use the Internet's resources, such as the available bandwidth.

Figure 9:
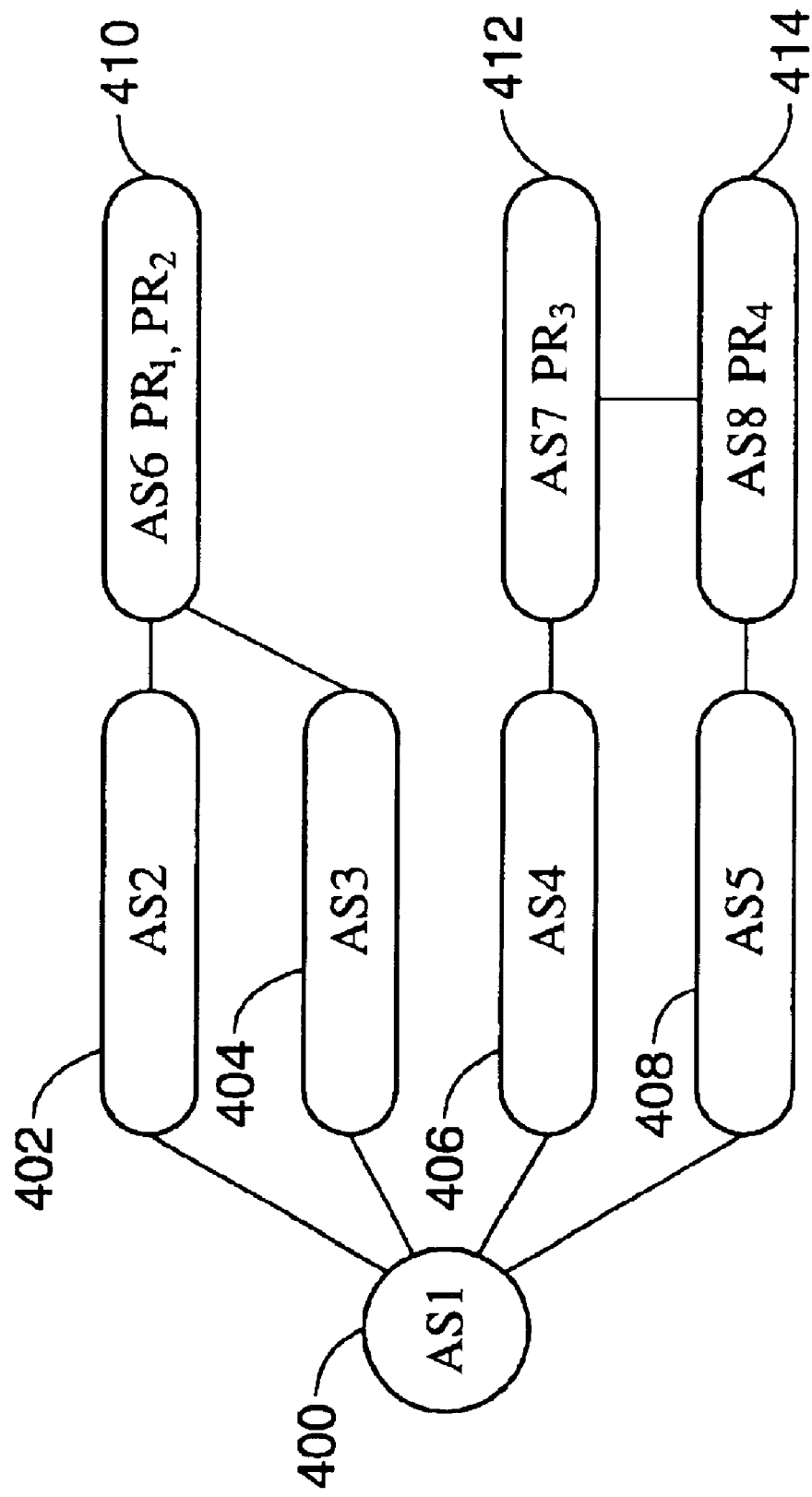
FIG. 9 is a schematic diagram of a network having an AS that is highly multi-homed.

For example, FIG. 9 shows a schematic diagram of an example of a network configuration in which there are eight ASes: AS1 400, AS2 402, AS3 404, AS4 406, AS5 408, AS6 410, AS7 412 and AS8 414. AS6 410 is shown as including prefixes $PR_1$ and $PR_2$, AS7 412 is shown as including prefix $PR_3$, and AS8 414 is shown as including prefix $PR_4$. However, it will be appreciated that a network might include fewer or greater ASes and that each AS would include at least one prefix. Note also that FIG. 9 shows that AS1 400 has several neighboring ASes. In this regard, AS 400 is what is referred to as a "highly multi-homed" AS; that is, it is directly connected to a large number of other ASes.

Assuming that each of the eight ASes is considered to be a source AS, a possible routing table for this configuration is shown in FIG. 10. It will be appreciated, however, that the routing table shown in FIG. 10 is merely an example, and that there are many other routing tables that could be used as well due to the number of alternative paths that are available.

Figures 11, 12, 13, 14, 15:
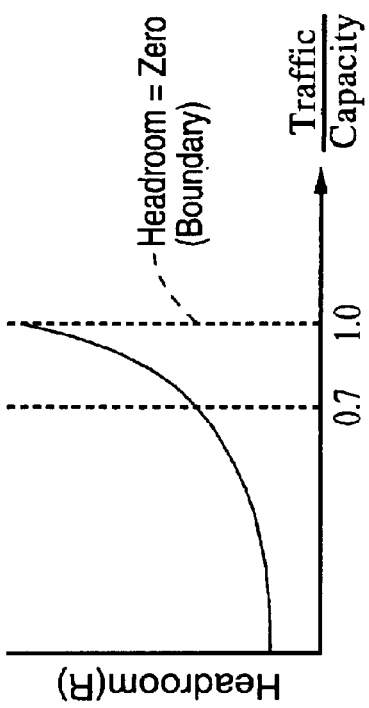
FIG. 11 is an example of a routing table for a single source AS in the network configuration shown in FIG. 9.
FIG. 12 is a first alternative of the routing table shown in FIG. 11.
FIG. 13 is a second alternative of the routing table shown in FIG. 11.
FIG. 14 is a third alternative of the routing table shown in FIG. 11.
FIG. 15 is a graph depicting parameters of an embodiment of headroom function according to the invention.

Focusing on source AS1 400, FIG. 9 also shows that a number of routes from AS1 400 to AS6 410 or AS7 412 or AS8 414 are available. This means that the first row of the routing table shown in FIG. 10 could have a number of alternative entries as shown in FIG. 11 through FIG. 14. For example, in FIG. 11 traffic to prefixes $PR_1$ and $PR_2$ (which both reside within AS6 410) is routed through AS2 402 as the next-hop AS. Or, traffic to both prefixes could be routed through AS3 404 as shown in FIG. 12. In the event of a tie between AS2 402 and AS3 404 based on performance, the tie can be broken arbitrarily. Alternatively, we can break the tie by balancing load over that portion of the network. For example, in the routing table of FIG. 13, traffic to prefixes $PR_1$ and $PR_2$ is split between AS2 402 and AS3 404, respectively. It will be appreciated, however, that load balancing is not limited to the case where there is a tie between routes based on performance; the load, or alternatively the headroom, over a particular route can be an additional factor for purposes of optimizing routing in general.

Referring also to FIG. 14, a still further alternative routing table based on FIG. 9 is given that assumes that AS5 408 is suboptimal as the next-hop AS for routing traffic to prefix $PR_4$. In the routing table of FIG. 14, AS4 406 is chosen as the next-hop AS for routing traffic to prefix $PR_4$ (i.e., through AS7 412 instead of directly to AS8 414). Those skilled in the art will appreciate that the foregoing routing tables are by way of example only, that that many alternative routing tables could be generated for the network configuration shown in FIG. 9.

As can be seen, therefore, a number of alternative routing tables may be applicable to sending traffic from a source AS to a destination. With the foregoing discussion pertaining to routing tables in mind, the cost function for determining the cost associated with a routing matrix will now be discussed.

(b) Cost Function

The cost function determines the cost of using any routing matrix. Note that it is possible to apply the same cost function to a routing matrix regardless of how many rows are present in the routing matrix. In other words, it is not necessary to modify the cost function if the number of source ASes that use the same routing optimization component increases.

An example cost function that incorporates some of the terms most relevant to routing can be described as $$C(R) = k1 \cdot Latency(R) + k2 \cdot Headroom(R) + k3 \cdot Price(R),$$

where R is the routing matrix, C is the cost of the routing matrix, and k1, k2 and k3 are coefficients to allow for convenient tuning of the relative significance of that term.

An example of the form of the first term, Latency(R), is $$\frac{\sum Traffic[i, j] \cdot Latency[i, j, R[i, j]]}{\sum Traffic[i, j]},$$

where Traffc[i,j] represents the amount of traffic that is being sent to prefix j from AS i, and Latency[i,j,R[i,j]] represents the amount of latency that is expected when reaching prefix j from AS i, using the next-hop AS R[i,j]. The reason this is a good choice for describing Latency(R) is that it represents the average latency per byte, so a small value represents a small average latency.

The second term, Headroom(R) refers to the queuing effects that are encountered when the amount of traffic routed over any path is large compared to the available capacity. Although it is difficult to know the precise capacity along an entire path, the capacity between the source ASes and their neighbors should be available. The queuing effects could be described using a very accurate queuing model, but for the purpose of this invention, a simple piecewise linear function is sufficient. Such a function should account for the fact that when the ratio of traffic to capacity is small, the queuing effects are negligible, but when that ratio is large, the queuing effects are significant. For example, the following function uses 70% of total capacity as the threshold where the Headroom(R) term becomes significant as depicted in FIG. 15:

Headroom[R]=If [TrafficToCapacityRatio[i,k]<0.7, then kSmall·TrafficToCapacityRatio[i,k], else kLarge·TrafficToCapacityRatio[i,k]

where $$TrafficToCapacityRatio[i, k] = \frac{\sum If[R[i, j] = k, Traffic[i, j], else\ 0]}{Capacity[i, k]},$$

and kSmall is some small number and kLarge is some large number, with respect to the magnitudes of the other terms in the equation. Using this headroom function to account for queuing has the advantage that when the amount of traffic compared to the available capacity is large, the headroom will be the most significant factor in the equation, but when that ratio is small, the term will be small compared to the other factors. Note that the values of kSmall and kLarge, as well as the threshold level, are arbitrarily selected. Other weights and thresholds could be used as well, since the goal is simply to have the cost function grow quickly as the traffic to capacity ratio increases to a point that the headroom term should be considered significant.

The price term Price(R) is simply the dollar amount that it would cost to route traffic according to the routing matrix. This will depend on the economic agreements between each source AS and each next-hop AS, as well as the amount of traffic that the routing matrix would cause each source AS to deliver to each next-hop AS.

There are several other terms that might appear in the cost function. For example, packet loss is very relevant to route selection and can be added to the cost function in a manner that is exactly analogous to latency. A less obvious example of a term that might be useful is a Route-Change term where Route-Change(R)=the number of routes that would be changed if this routing matrix is used in practice. The Route-Change term may be useful to avoid making unnecessary changes, or to help prevent oscillations over time.

(c) Minimization Algorithm

There are several well-known algorithms that could be used to minimize the cost function. Each such algorithm offers different tradeoffs between speed, optimality, and resource requirements. Some examples are Genetic Algorithms, Simulated Annealing, and Gradient Search. Genetic algorithms are probably too memory intensive to be practical, given the size of the routing tables. Although Simulated Annealing does not require very much memory in comparison to Genetic Algorithms, it is probably too slow given the rate at which new routing tables will need to be generated to respond to changing network conditions. Gradient Search is not memory intensive, and it is very fast compared to Simulated Annealing, but its solutions are often suboptimal because it can get trapped in local minima.

While it is clear that many techniques can be used to find routing matrices with small cost, as defined by the cost function, the preferred algorithm is a surprisingly simple biased random walk with occasional up-hill moves to escape from local minima. To be more specific, the algorithm works by randomly generating a starting routing matrix. It then proceeds for some number of iterations by randomly selecting some source AS, i, and some destination prefix, j. With some probability, it either randomly assigns a new next-hop AS to R[i,j], or it assigns the next-hop AS to R[i,j] that results in the lowest cost. To find the next-hop AS that results in the lowest cost, it iterates over all alternative next-hop ASes, assigns them to R[i,j], and then evaluates the cost function over the new routing matrix. Like gradient search, this algorithm only makes local moves. However, it does not get trapped on local minima as easily because of the occasional random moves.

A practical problem with the biased random walk algorithm is that in each iteration, unless it is randomly assigning the next-hop AS, it has to evaluate the cost function one time for each next-hop AS selection. If the cost function is slow to compute, then this can limit the number of iterations of the algorithm that can be computed in a reasonable amount of time. This is an issue because if the algorithm is not able to run for many iterations, then the routing matrix at the final iteration will not be very optimal. It is often possible to speed up the evaluation of cost function by caching information at each stage in the evaluation and just updating that information.

For example, consider a cost function $$C(R) = k1 \cdot Latency(R) + k2 \cdot Headroom(R),$$

with the latency and headroom terms defined as before. Assume there is some routing matrix R0 with R0[AS1, PR1]=AS2, and with C(R0)=C0. Construct R1 to be identical to R0, except that R1[AS1,PR1]=AS3. It is possible to compute C(R1) much more quickly than simply applying the cost function to the new R1. From the definition of the cost function, C(R0)=k1·Latency(R0)+k2*Headroom(R0), and C(R1)=k1·Latency(R1)+k2*Headroom(R1). The speedup of the latency term comes from the observation that k1·Latency (R1)=k1·Latency(R0)-Latency[AS1, PR1, R0[AS1, PR1]]+ Latency[AS1, PR1, R1, R1[AS1, PR1]]. Therefore, it is possible to compute the new latency term by simply caching the previous latency term Latency(R0).

The headroom term is slightly more complicated because of the non-linear queuing effects. However, if a matrix is used to keep track of the amount of traffic that is sent to each neighboring AS, then the headroom term can also be computed quickly. If NeighborTraffic_R0 is a matrix indicating the amount of traffic that is sent to each AS from any other AS, then NeighborTraffic_R1 can be defined as NeighborTraffic_R1[AS1, AS2]=NeighborTraffic_R0[AS1,AS2]- Traffic[AS1, PR1].

In addition,

NeighborTraffic_R1 [AS1, AS3]=NeighborTraffic_R0 [AS1,AS3]+Traffic[AS1,PR1]. For all other pairs of ASes, NeighborTraffic_R1[i,k]=NeighborTraffic_R0[i,k]. From the NeighborTraffic_R1 matrix, it is easy to compute the headroom term. Whereas the previous headroom term computed the TrafficToCapacityRatio from $$TrafficToCapacityRatio[i, k] = \frac{\sum \text{If}[R[i, j] = k, \text{Traffic}[i, j], \text{else } 0]}{Capacity[i, k]},$$

using the NeighborToTraffic matrix it is possible to compute that value from $$TrafficToCapacityRatio[i, k] = \frac{NeighborToTraffic\_R[i, k]}{Capacity[i, k]}.$$

This approach will not work for certain kinds of cost functions, but whenever the cost is just the sum of the cost contributions from each of the variables, it is correct to say that Cost(R1)=Cost(R0)−CostContribution(OldValue)+ CostContribution(NewValue). If those individual contributions are fast to compute, then finding the new cost from the old cost is also fast, provided there are a small number of changes.

(d) Multiple Source ASes

As indicated previously, the present invention can be used to optimize routing tables for a system with multiple source ASes. An example of such a routing table was given in FIG. 10. The routing table that is generated by optimizing a system of multiple source ASes is potentially more optimal than what could be generated by making the routing decisions independently. For example, the optimization algorithm could assign routes to each of the source ASes such that the traffic from all of those source ASes does not exceed the available capacity on any path. If the decisions were made independently, however, then a source AS might route traffic along a path even if the capacity for that path had already been consumed by some other source's traffic. However, if a single instance of the routing optimization algorithm selects the routes for several source ASes, then those source ASes may lose functionality if they cannot communicate with that routing optimization algorithm to receive the routing decisions. In addition to added failure possibilities from centralizing the routing, the optimization algorithm could become too slow if the number of rows in the routing matrix is very large.

When optimizing the routing for several source ASes, this invention partitions the routing matrix so that portions can be solved in parallel. FIG. 16 shows an example of the routing table of FIG. 10 where ovals depict partitions. Each instance of the routing optimization algorithm uses the entire routing matrix, but it is only allowed to modify some of the entries in that matrix. The source ASes each run an instance of the algorithm that is allowed to modify any element in the row corresponding to that source AS. There is also a "central" instance of the algorithm that is allowed to modify any element in any column corresponding to a prefix that is contained in any source AS. Note that the portion of the matrix that an instance of the algorithm running at a source AS is allowed to modify overlaps with the portion of the matrix that the central algorithm is allowed to modify. However, there is no overlap between the portions of the matrix that can be modified by the algorithms running at each source AS.

The central instance of the algorithm must periodically retrieve a copy of the routing matrix from each source AS and send a copy of its routing matrix to each source AS. When the central instance of the algorithm obtains a copy of the routing matrix from some source AS, it copies certain entries from that routing matrix into its own routing matrix. Specifically, it copies those entries from the row corresponding to that source AS that are not in columns corresponding to prefixes contained in other source ASes. When the instance of the algorithm running at a source AS receives a copy of the routing matrix from the central algorithm instance, it also copies certain entries into its own routing matrix. It copies all entries from all rows that do not correspond to that source AS. From the row corresponding to that source AS, it copies all entries from all columns that correspond to prefixes contained in other source ASes.

3. BGP Bridge Component

At this point it should be appreciated that the decisions made by routing optimization component 104 in a source AS need to be propagated to each of the routers in that AS. This is accomplished using BGP bridge component 106.

In operation, routing optimization component 104 sends the row in the routing matrix corresponding to that AS to BGP bridge 106 which is a route server that uses external BGP (EBGP) to peer with each of the neighboring ASes as well as with a route reflector within the AS. The route server is modified to include a non-BGP bi-directional communication channel to routing optimization component 104 that allows BGP bridge 106 to communicate all BGP views to routing optimization component 104, and further allows routing optimization component 104 to communicate a routing table to BGP bridge 106. An optional modification would be to make BGP bridge 106 communicate in IBGP as well. Based on the paths it receives from the neighboring ASes as well as the routing table it receives from routing optimization component 104, BGP bridge 106 selects which next hop should be used to reach any given prefix. In most circumstances, BGP bridge 106 will just select the next-hop specified by routing optimization component 104. Because BGP bridge 106 peers with the neighboring ASes, however, it may learn that a route specified by routing optimization component 104 is invalid, possibly as a result of a route withdrawal. If a route specified by routing optimization component 104 cannot be used, then BGP bridge 106 will make the selection based on information received from the neighboring ASes using standard BGP path selection algorithms and will convey this information to routing optimization component 104. The selection is communicated to the route reflector using EBGP, and the route reflector communicates that decision to all of the other routers in the AS using internal BGP (IBGP).

Deployment in PNAPS

Figure 17:
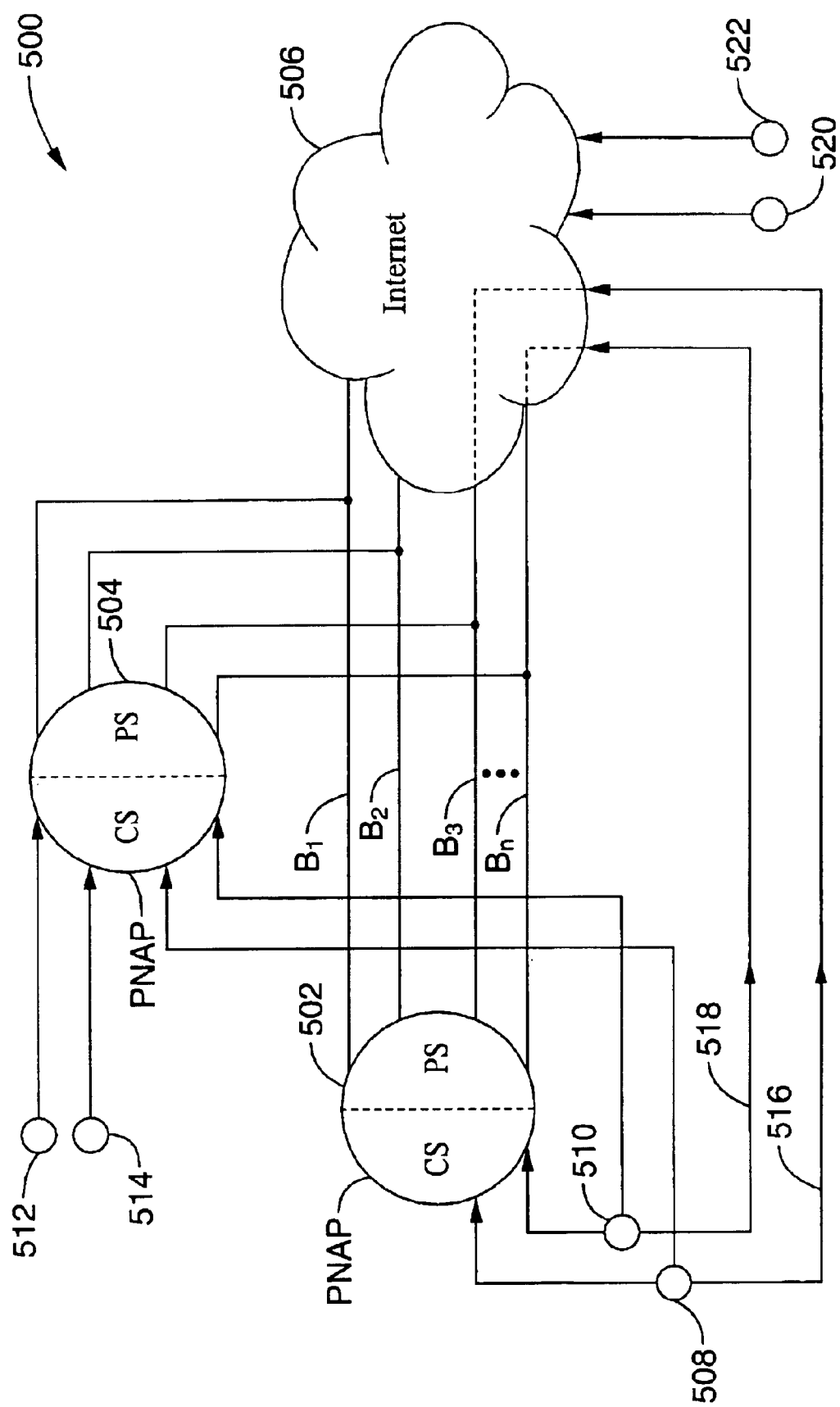
FIG. 17 is a schematic diagram showing an interconnected network with two PNAPs and two multi-homed customers connected to the Internet.

Thus far the invention has been described in connection with ASes in general, and particularly in connection with ASes that are multi-homed. The invention is also particularly suitable for use in connection with a network employing a private network access point (PNAP), which is a highly multi-homed AS. In general terms, a PNAP can be thought of as being made up of two halves. One half connects to customers; the other half connects to NSPs or "Network Service Providers". These NSP's are in turn connected to destinations, which may be customers of the NSPs or customers of other PNAPS. For example, FIG. 17 shows a schematic diagram of an interconnected network 500 with a first PNAP 502 and a second PNAP 504 connected to the Internet 506 through a plurality of backbones B1 through Bn provided by NSPs. Each PNAP is shown with a vertical dashed line dividing it into a customer side CS and a provider side PS which is connected to a plurality of backbones. In the example shown, the provider sides of the PNAPs are connected to each other through backbones B through Bn, which in turn are connected to the Internet 506. Note that, while only two PNAPs are shown, there could be one or any other number of PNAPs in the network.

To simplify the diagram, only two customers 508, 510 are shown connected to the customer side of PNAP 502 and only two customers 512, 514 are shown connected to the customer side of PNAP 504. It will be appreciated, however, that more customers would typically be connected to the customer sides of the PNAPs. Note that customers 508, 510 are shown connected to the customer sides of both PNAPs and, therefore, are considered to be "multi-homed". However, a customer alternatively may be connected to only one PNAP or any number of PNAPs at the same time. Note also that customers 508, 510 are shown connected to links 516, 518, respectively, to Internet 506. This is also considered to be a "multi-homed" configuration. It will be appreciated, however, that it is not necessary for any customer to be multi-homed.

As indicated above, the provider sides of the PNAPs are connected to a plurality of backbones provided by NSPs. These backbones in turn form a large portion of the fabric of the Internet 506 to which Internet users such as destinations 520, 522 are also connected. Only two such destinations are shown to simplify the diagram, although there may be any number of destinations. Note that the NSPs do not exchange traffic among themselves through the PNAPs over these backbones. Traffic exchanges between the NSPs providing backbones B1 through Bn take place at public or private peering points (not shown). For example, customer 508 would typically route its traffic through PNAP 502 from the customer side to the provider side. PNAP 502 would then select the path from the customer to a destination on another PNAP, or to a non-PNAP destination such as destination 520, over one of the backbones B1 through Bn.

It will be appreciated that, in order for traffic to be routed from a PNAP customer to a destination, one or more routers in the PNAP must have a routing table that specifies a next-hop AS to the destination. Referring again to FIG. 2, and as discussed previously, BGP bridge 106 communicates routing information from routing optimization component 104 to routers 116 in a BGP compatible format. It will be appreciated that when the present invention is implemented in a PNAP, routers 116 would reside in the PNAP. Note also that, in the configuration shown, any change in the routing table can be propagated by BGP bridge 106 to every router in the PNAP. It is also possible for BGP bridge 106 to propagate the information to every router in every PNAP.

Note that this is different than the manner in which routing tables are propagated in U.S. Pat. No. 6,009,081 which is incorporated herein by reference. In that system, each PNAP has a unique AS, all routers in a PNAP communicate with each other and have the same AS as the PNAP, and each backbone has a unique AS. A route reflector is used to collate all of the routes, apply a policy, and propagate a filtered set of routes to all routers in the PNAP based on the policy applied. In the present invention, however, route reflectors are not required; instead, BGP bridge 106 can be logically tied to each core router or edge router, as the case may be, and propagate the routes directly. The core routers and edge routers simply forward packets and do not make policy decisions. If routing optimization component 104 fails, BGP bridge 106 will continue with the existing routing table.

Figure 18:
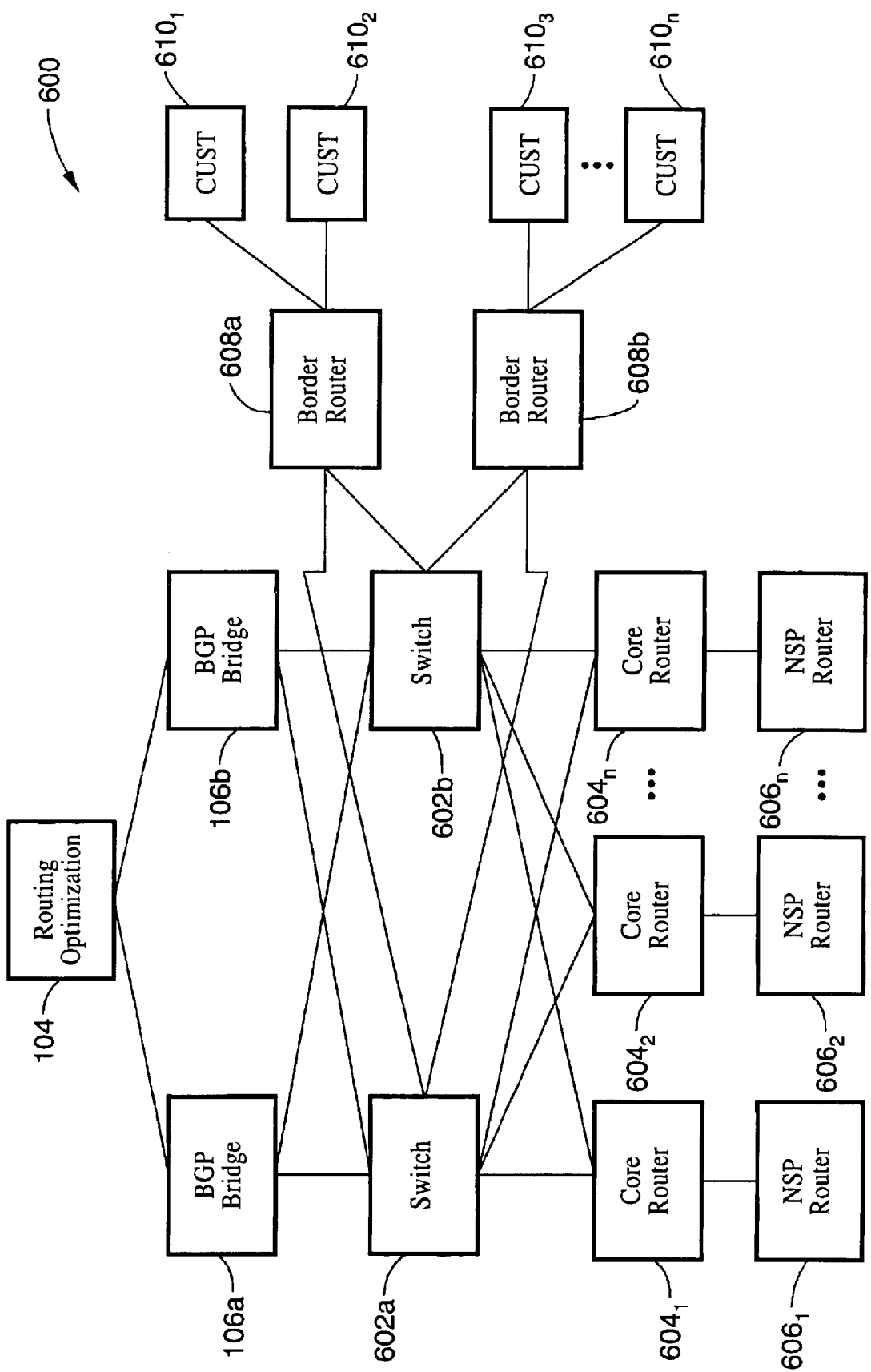
FIG. 18 is a block diagram of an example of a router configuration in connection with which the invention can be employed wherein core and border routers are used.

By way of further explanation of the interface between BGP bridge 106 and the routers in a PNAP, FIG. 18 gives an example of an expanded router configuration 600 in which core and border routers are employed. In the example shown in FIG. 18, a pair of BGP bridges 106a, 106b are connected to routing optimization component 104 for redundancy. BGP bridges 106a, 106b are in turn connected to switches 602a, 602b, which are in turn connected to a plurality of core routers $604_1$, through $604_n$, each of which is in turn connected to an NSP router $606_1$, through $606_n$. In addition, border routers 608a, 608b are connected to switches 602a, 602b, and customers $610_1$ through $610_n$ are connected to border routers 608a, 608b.

In operation, BGP bridges 106a, 106b obtain the paths to destinations from NSP routers 606 through normal BGP peering sessions. BGP bridges 106a, 106b then communicate that information to routing optimization component 104 for optimization as previously described. After optimization, routing optimization component 104 in turn communicates a routing table for each destination prefix to BGP bridges 106 for determining path selection. In the event that routing optimization component 104 becomes inoperational for any reason, the BGP bridges will continue to make path selection decisions based on the last routing table received and the dynamic information received from the NSPs.

Border routers 608 are connected to core routers 604 through switches 602 and peer with BGP bridges 106. Core routers 604 also peer with BGP bridges 106. Peering between the cores/borders and the BGP brides is through IBGP, while EBGP is used for communication between NSP routers 606 and BGP bridges 106. Traffic forward decisions are made by border routers 608 which get a single path from BGP bridges 106. Core routers 604, which get the same single path as the border routers, forward the traffic to NSP routers 606.

Note that, by communicating a routing table to the BGP bridge, routing optimization component 104 has a great deal of flexibility in routing including, but not limited to, taking into account routing decisions based on optional levels or qualities of service.

Figure 19:
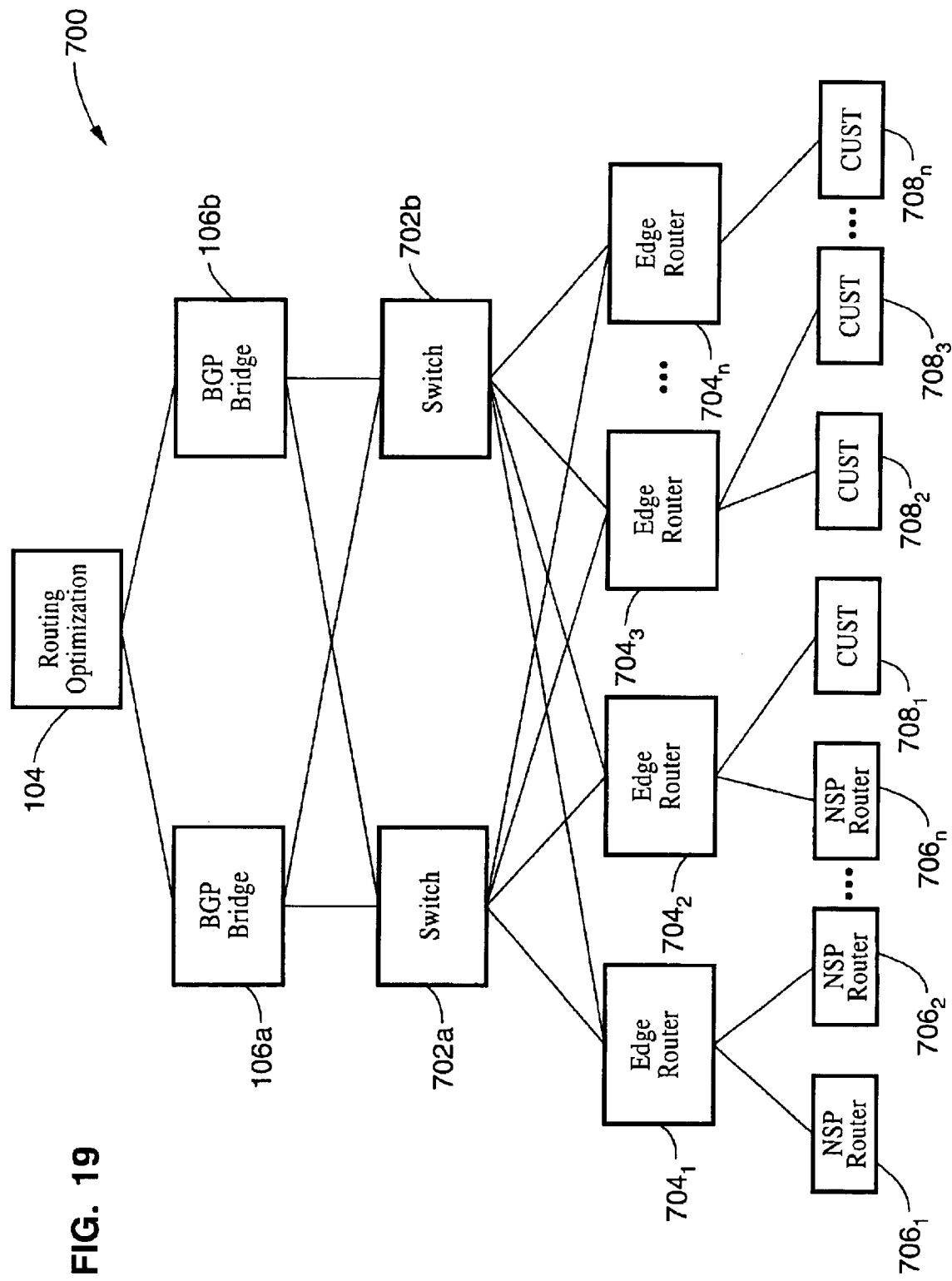
FIG. 19 is a block diagram of an example of a router configuration in connection with which the invention can be employed wherein edge routers are used.

Referring now to FIG. 19, a more generic example of a router configuration 700 is shown to further illustrate how the invention can be implemented in a PNAP. Here, the core and border routers shown in FIG. 18 have been eliminated. Instead, BGP bridges 106 peer with edge routers $704_1$ through $704_n$ through switches 702 using IBGP. BGP bridges 106 also peer with NSP routers 706 and customers 708 using EBGP. Note that customer peering is permitted only if the customer has a BGP compatible router, in which event the customers can be provided with routing information for routing decisions by the customer. Note also that the BGP bridges do not send all information regarding the network of which they are aware to all peers. Instead, only customer routes are sent to the NSP routers. If NSP routes were also sent, traffic could inadvertently be transited between NSPs through the PNAP.

As can be seen, therefore, BGP bridges 106 receive prefixes for all available paths from the NSP routers and communicate that information to routing optimization component 104. Routing optimization component 104 in turn influences path selection by communicating a routing table to the BGP bridge for determining path selection.

Figure 20:
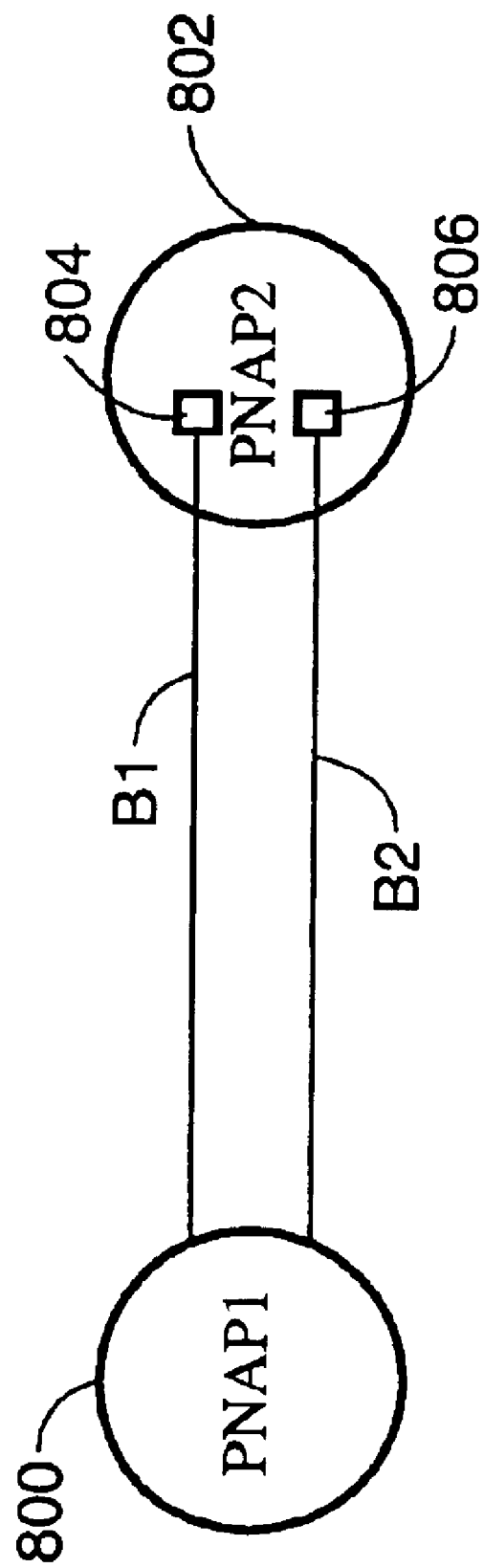
FIG. 20 is a schematic diagram showing two interconnected PNAPs and addressable devices associated with backbone providers for probing specific backbones.

An additional characteristic of implementing the present invention in a PNAP pertains to obtaining performance measurements. As discussed previously, latency is a significant factor in determining the performance of a particular route and there are several ways in which to determine latency, such as using pings as described previously. Since a PNAP can be connected to multiple backbones, however, there is a need to be able to make latency measurements over a particular backbone. One way of doing so is by specifying the next-hop AS in the ping, using what is referred to as the "loose source routing" feature of IP. However, loose source routing is not uniformly supported. Referring to FIG. 20, an alternative approach is to place an addressable device at the PNAP end of each backbone connection, with an address that is unique to the particular backbone provider. As shown in FIG. 20, for example, PNAP1 800 and PNAP2 802 are interconnected through backbone B1 established by a first provider and backbone B2 established by a second provider. A first addressable device 804 is placed in PNAP2 802 with an address that is unique to the provider of backbone B1. Similarly, a second addressable device 806 is placed in PNAP2 802 with an address that is unique to the provider of backbone B2. Each addressable device can then be probed over its associated backbone for making a latency measurement from PNAP1 to PNAP2. Note also that the circular intersection and inferences methods described previously can be used as well to infer latency to a particular destination that cannot be probed. Accordingly, it will be seen that this invention optimizes the routing of traffic over the Internet. While the invention has been described in the context of a network employing ASes, including PNAPs, those skilled in the art will appreciate that the invention can be applied to any data communications network. It will also be appreciated that, while the discussion has focused on AS to prefix traffic flows, the techniques described herein can be applied to traffic flows between any points on a network. Furthermore, it will be appreciated that the invention described herein can be used as a network monitoring tool to determine if a problem exists on the network. Since every performance monitoring and inference component is a testing station for every other point on the network, the routing optimization component can use this information to monitor network traffic flow and the cost of sending the traffic over particular routes. Therefore, a high relative cost for a particular route can be used as an indicator of a problem on the network.

It will be appreciated that the method and system would preferably be computer implemented using a conventional computer system that includes associated software, hardware, communications interfaces and the like to carry out the functions described herein. Those skilled in the art will appreciate that the actual code to implement the invention as described herein can be written for various platforms using conventional programming techniques. Accordingly, the details of the code are not presented herein.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for routing traffic from a source to a routing destination in a network where a plurality of routes arm available, comprising:

assigning a cost to each of said routes and selecting the route with the lowest cost as defined by a cost function, wherein said cost is a function of a path characteristic over the route to which said cost is assigned;

for at least one route, determining the location of said routing destination and inferring said path characteristic based on measurement of said path characteristic associated with sending tic from said source to another destination over said available routes, wherein the location of said routing destination is determined by circular intersection by:

measuring the time it takes for traffic to move from a plurality of source locations to said routing destination;

converting said times to distance equivalents;

forming a plurality of intersecting circles using said distance equivalents as the radius of circles with said source locations as the center; and determining the physical location of said routing destination from the intersection of said circles.

2. Method as recited in claim 1, further comprising: propagating the selected route to a router.

3. A method as recited in claim 2, further comprising: causing the router to route traffic from said source to said routing destination over said selected route.

4. A method as recited in claim 1, wherein said path characteristic is selected from the group consisting of latency, packet loss, headroom, price, path length, Route-Change, and BGP reachability.

5. A method as recited in claim 1, further comprising inferring said path characteristic by determining a weighted average of said path characteristic from said source to other destinations based on physical proximity of said other destinations to said routing destination.

6. A method as recited in claim 1, further comprising:

measuring latency between said source and a plurality of other destinations;

determining physical distances between said routing destination and said other destinations;

computing a weighted average of said latency measurements as a function of said distances; and using said weighted average as an estimate of the latency between said source and said routing destination.

7. A method for routing traffic from a source to a routing destination in a network where a plurality of routes are available, comprising:

obtaining a measurement of a path characteristic associated with routing traffic from said source to said routing destination for a first route; and determining the location of said routing destination and inferring said path characteristic for a second route based on measurement of said path characteristic associated with sending traffic from said source to another destination, wherein the location of said routing destination is determined by circular intersection by:

measuring the time that it takes for traffic to move from a plurality of source locations to said routing destination;

converting said times to distance equivalents; and forming a plurality of intersecting circles using said distance equivalents as the radius of circles with said source locations as the center;

using a cost function, assigning a cost to each available route as a function of the path characteristic associated with said route;

minimizing said cost function over said available routes; and routing said traffic according to the lowest cost route determined by minimizing said cost function.

8. Method as recited in claim 7, further comprising: propagating said lowest cost route to a router.

9. A method as recited in claim 8, further comprising: causing the router to route traffic from said source to said routing destination over said lowest cost route.

10. A method as recited in claim 7, wherein said path characteristic is selected tom the group consisting of latency, packet loss, headroom, price, path length, Route-Change, and BGP reachability.

11. A method as recited in claim 7, further comprising inferring said path characteristic by determining a weighted average of said path characteristic from said source to other destinations based on physical proximity of said other destinations to said routing destination.

12. A method as recited in claim 7, further comprising:

measuring latency between said source and a plurality of other destinations; determining physical distances between said routing destination and said other destinations;

computing a weighted average of said latency measurements as a function of said distances; and using said weighted average as an estimate of the latency between said source and said routing destination.

13. A method for routing traffic from a source to a routing destination in a network where a plurality of routes are available, comprising:

obtaining a measurement of a path characteristic associated with routing traffic from said source to said routing destination for a first route; and determining the location of said routing destination and inferring said path characteristic for a second route based on measurement of said path characteristic associated with sending traffic from said source to another destination, wherein the location of said routing destination is determined by circular intersection by:

measuring the time that it takes for traffic to move from a plurality of source locations to said routing destination;

converting said times to distance equivalents; and forming a plurality of intersecting circles using said distance equivalents as the radius of circles with said source locations as the center; and determining the physical location of said routing destination from the intersection of said circles;

using a cost function, assigning a cost to each available route as a function of the path characteristic associated with said route;

selecting the route with the lowest cost as defined by said cost function; and routing said traffic according to the lowest cost route.

14. A method as recited in claim 13, further comprising: propagating said lowest cost route to a router.

15. A method as recited in claim 14, further comprising: causing the router to route traffic from said source to said routing destination over said lowest cost route.

16. A method as recited in claim 13, wherein said path characteristic is selected from the group consisting of latency, packet loss, headroom, price, path length, Route-Change, and BGP reachability.

17. A method as recited in claim 13, further comprising inferring said path characteristic by determining a weighted average of said path characteristic from said source to other destinations based on physical proximity of said other destinations to said routing destination.

18. A method as recited in claim 13, further comprising:
measuring latency between said source and a plurality of other destinations;
determining physical distances between said routing destination and said other destinations;
computing a weighted average of said latency measurements as a function of said distances; and
using said weighted average as an estimate of the latency between said source and said routing destination.

19. A method for routing traffic from a source to a routing destination in a network where a plurality of routes are available, comprising:
obtaining a measurement of a path characteristic associated with routing traffic from said source to said routing destination for a first route; and
inferring said path characteristic for a second route based on measurement of said path characteristic associated with sending traffic from said source to another destination, wherein the location of said routing destination is determined by circular intersection by:
measuring th time that it takes for traffic to move from a plurality of source locations to said routing destination;
converting said times to distance equivalents;
forming a plurality of intersecting circles using said distance equivalents as the radius of circles with said source locations as the center; and
determining the physical location of said routing destination from the intersection of said circles;
using a cost function, assigning a cost to each available route as a function of the path characteristic associated with said route;
minimizing said cost function over said routes and identifying a route with the lowest cost of routing said traffic as defined by said cost function; and
generating a routing table containing said lowest cost route.

20. A method as recited in claim 19, further comprising:
propagating the routing table to a router.

21. A method as recited in claim 20, further comprising:
causing the router to apply said routing table to said routes.

22. A method as recited in claim 19, wherein said path characteristic is selected from the group consisting of latency, packet loss, headroom price, path length, Route-Change, and BGP reachability.

23. A method as recited it claim 19, further comprising inferring said path characteristic by determining a weighted average of said path characteristic from said source to other destinations based on physical proximity of said other destinations to said routing destination.

24. A method as recited in claim 19, further comprising:
measuring latency between said source and a plurality of other destinations; determining physical distances between said routing destination and said other destinations;
computing a weighted average of said latency measurements as a function of said distances; and
using said weighted average as an estimate of the latency between said source and said routing destination.

25. A computer-readable medium comprising commuter-executable instructions for:
assigning a cost to each routes from a source to a routing destination in a network where a plurality of routes are available, wherein said cost is a function of a path characteristic over the route, and selecting the route with the lowest cost as defined by a cost function, wherein assigning a cost to each of said routes comprises:
determining, the location of said routing destination and inferring said path characteristic based on measurement of said path characteristic associated with sending traffic from said source to another destination over said available routes, wherein determining the location of said routing destination comprises:
measuring the time that it takes for traffic to move from a plurality of source locations to said routing destination;
converting said times to distance equivalents;
forming a plurality of intersecting circles using said distance equivalents as the radius of circles with said source locations as the center; and
determining the physical location of said routing destination from the intersection of said circles.

26. A computer-readable medium as recited in claim 25, further comprising computer-executable instructions for propagating the selected route to a router.

27. A computer-readable medium as recited in claim 26, further comprising computer-executable instructions for causing the router to route traffic from said source to said routing destination over said selected route.

28. A computer-readable medium as recited in claim 25, wherein said path characteristic is selected from the group consisting of latency, packet loss, headroom, price, path length, Route-Change, and BGP reachability.

29. A computer-readable medium as recited in claim 25, further comprising computer-executable instructions for inferring said path characteristic by determining a weighted average of said path characteristic from said source to other destinations based on physical proximity of said other destinations to said routing destination.

30. A computer-readable medium as recited in claim 25, further comprising computer-executable instructions for:
measuring latency between said source and a plurality of other destinations;
determining physical distances between said routing destination and said other destinations;
computing a weighted average of said latency measurements as a function of said distances; and
using said weighted average as an estimate of the latency between said source and said routing destination.

31. A computer-readable medium including computer executable instructions for routing traffic source to a routine destination in a network where a plurality of routes are available, wherein the instructions comprise:
obtaining a measurement of a path characteristic associated with routing traffic from said source to said routing destination for a first route; and
determining the location of said routing destination and inferring said path characteristic for a second route based on measurement of said path characteristic associated with sending traffic from said source to another destination by:
measuring the time that it takes for traffic to move from a plurality of source locations to said routing destination;
converting said times to distance equivalents;
forming a plurality of intersecting circles using said distance equivalents as the radius of circles with said source locations as the center; and determining the physical location of said routing destination from the intersection of said circles;

using a cost function, assigning a cost to each available route as a function of the path characteristic associated with said route;

minimizing said cost function over said available routes; and routing said traffic according to the lowest cost route determined by minimizing said cost function.

32. A computer-readable medium as recited in claim 31, further comprising computer-executable instructions for propagating said lowest cost route to a router.

33. A computer-readable medium as recited in claim 32, further comprising computer-executable instructions for causing the router to route traffic from said source to said routing destination over said lowest cost route.

34. A computer-readable medium as recited in claim 31, wherein said path characteristic is selected from the group consisting of latency, packet loss, headroom, price, path length, Route-Change, and BGP reachability.

35. A computer-readable medium as recited in claim 31, further comprising computer-executable instructions for inferring said path characteristic by determining a weighted average of said path characteristic from said source to other destinations based on physical proximity of said other destinations to routing destination.

36. A computer-readable medium as recited in claim 31, further comprising computer-executable instructions for:

measuring latency between said source and a plurality of other destinations;

determining physical distances between said routing destination and said other destinations;

computing a weighted average of said latency measurements as a function of said distances; and using said weighted average as an estimate of the latency between said source and said routing destination.

37. A computer-readable medium including computer-executable instructions fort routing traffic from a source to a routing destination in a network wherein a plurality of routes are available, wherein the instructions comprise:

obtaining a measurement of a path characteristic associated with routing traffic from said source to said routing destination for a first path; and determining the location of said routing destination and inferring said path characteristic for a second route based on measurement of said path characteristic associated with sending traffic from said source to another destination by:

measuring the time that it takes for traffic to move from a plurality of source locations to said routing destination;

converting said times to distance equivalents;

forming a plurality of intersecting circles using said distance equivalents as the radius of circles with said source locations as the center; and determining the physical location of said routing destination from the intersection of said circles;

using a cost function, assigning a cost to each available route as a function of the path characteristic associated with said route;

selecting the route with the lowest cost as defined by said cost function; and routing said traffic according to the lowest cost route.

38. A computer-readable medium as recited in claim 37, further comprising computer-executable instructions for propagating said lowest cost route to a router.

39. A computer-readable medium as recited in claim 38, further comprising computer-executable instructions for causing the router to route traffic from said source to said routing destination over said lowest cost route.

40. A computer-readable medium as recited in claim 37, wherein said path characteristic is selected from the group consisting of latency, packet loss, the headroom, price, path length, Route-Change, and BGP reachability.

41. A computer-readable medium as recited in claim 37, further comprising computer-executable instructions for inferring said path characteristic by determining a weighted average of said path characteristic from said source to other destination based on physical proximity of said other destinations to said routing destination.

42. A computer-readable medium as recited in claim 37, further comprising computer-readable instructions for:

measuring latency between said source and a plurality of other destinations;

determining physical distances between said routing destination and said other destinations;

computing a weighted average of said latency measurements as a function of said distances; and said weighted average as an estimate of the latency between said source and said routing destination.

43. A computer-readable medium including computer-executable instructions for routing traffic from a source to a routing destination in a network where a plurality of routes are available, wherein the instructions comprise:

obtaining a measurement of a path characteristic associated with routing traffic from said source to said routing destination for a first path; and determining the location of said routing destination and inferring said path characteristic for a second route based on measurement of said path characteristic associated with sending tic from said source to another destination by:

measuring the time that it takes for traffic to move from a plurality of source locations to said routing destination;

converting said times to distance equivalents;

forming a plurality of intersecting circles using said distance equivalents as the radius of circles with said source locations as the center; and determining the physical location of said routing destination from the intersection of said circles;

using a cost function, assigning a cost to each available route as a function of the path characteristic associated with said route;

minimizing said cost function over said routes and identifying a route with the lowest cost of routing said traffic as defined by said cost function; and generating a routing table containing said lowest cost route.

44. A computer-readable medium as recited in claim 43, further comprising computer-executable instructions for propagating the routing table to a router.

45. A computer-readable medium as recited in claim 44, further comprising computer-executable instructions for causing the router to apply said routing table to said routes.

46. A computer-readable medium as recited in claim 43, wherein said path characteristic is selected from the group consisting of latency, packet loss, headroom, price, path length, Route-Change, and BGP reachability.

47. A computer-readable medium as recited in claim 43, further comprising computer-executable instructions for inferring said path characteristic by determining a weighted average of said path characteristic from said source to other destinations based on physical proximity of said other destinations to said routing destination.

48. A computer-readable medium as recited in claim 43, further comprising computer-executable instructions for:
measuring latency between said source and a plurality of other destinations;
determining physical distances between said routing destination and said other destinations;
computing a weighted average of said latency measurements as a function of said distances; and
using said weighted average as an estimate of the latency between said source and said routing destination.

49. A method for determining a route based on measured and inferred path characteristics, comprising:
measuring a path characteristic associated with a first path between a first subnet source and a first subnet destination;
measuring a path characterstics associated with a second path between the first subnet source and a second subnet destination;
inferring a path characteristic associated with a third path between the first subnet source and a third subnet destination using a weighted average of the measured path characteristic associated with the first path and the measured path characteristic associated with the second path; and
determining a next hop subnet for each of the paths using a cost function based on the path characteristic and at least one additional path characteristic, wherein the cost function uses a coefficient to weight the path characteristic and the at least one additional path characteristic.

50. The method of claim 49, wherein the weighted average is based on a distance between the first subnet destination and the third subnet destination and a distance between the second subnet destination and the third subnet destination.

51. The method of claim 50, wherein the distance between the first subnet destination and the third subnet destination is determined using circular intersection.

52. The method of claim 49, wherein the path characteristic is selected from the group consisting of latency, packet loss, headroom, price, path length, Route-Change and BGP reachability.

53. The method of claim 49, further comprising:
creating a routing table having a row that corresponds to the first subnet source and columns that correspond to each of the subnet destinations, wherein the routing table identifies the next hop subnet for the first subnet source and each of the subnet destinations.

54. The method of claim 49, wherein the subnet source and the net hop subnet correspond to autonomous systems.

55. The method of claim 49, wherein the subnet destination corresponds to an address prefix.

56. The method of claim 49, wherein determining a next hop subnet for each of the paths, comprises:
selecting the next hop subnet that corresponds to the path having a lowest path cost.

57. A method for identifying optimized routes between a plurality of subnet sources and a plurality of subnet destinations, comprising:
for each subnet source, obtaining performance data for a plurality of possible routes between the subnet source and the subnet destinations;
selecting an initial route based on the performance data; and
optimizing the routes by:
for each subnet source, optimizing the routes from the subnet source to the subnet destinations by selecting the routes having a lowest cost using a cost function that is based on weighted path characteristics; and
for each subnet destination, optimizing the routes from the subnet sources to the subnet destination by selecting the routes having a lowest cost based on the cost function.

58. The method of claim 57, further comprising:
creating a routing table having rows that correspond to each of the subnet sources and column that correspond to each of the subnet destinations, wherein the routing table identifies the next hop subnet for each subnet source and each subnet destination based on the optimization.

59. The method of claim 57, wherein the optimization of the routes between a selected subnet source and the subnet destinations is performed by the selected subnet source and wherein the optimization of the routes between the subnet sources and a selected subnet destination is performed centrally.

60. The method of claim 57, wherein the path characteristics are selected from the group consisting of latency, packet loss, headroom price, path length, Route-Change and BGP reachability.

61. The method of claim 57, wherein the subnet source and the net hop subnet correspond to autonomous systems.

62. The method of claim 57, wherein the subnet destination corresponds to an address prefix.

63. A method for propagating routes to a plurality of routers within an autonomous System (AS), comprising:
receiving route information from within the AS for a plurality of routes between the AS and a plurality of prefix destinations;
receiving route information from a plurality of neighboring ASs via Border Gateway Protocol (BGP);
based on the routing information from the AS and the neighboring ASs, determining a next hop AS for each of the routes between the AS and the prefix destinations; and
propagating the next hop donation to a plurality of routes within the AS.

* * * * *